United States Patent [19]

Yamamoto et al.

[11] Patent Number: 5,335,061
[45] Date of Patent: Aug. 2, 1994

[54] ENDOSCOPE HOLDING APPARATUS FOR INSPECTING THE INTERIORS OF A RECIPROCATING ENGINE AND ROTARY ENGINE HAVING IGNITION PLUG HOLES, ENDOSCOPE APPARATUS INCLUDING THE ENDOSCOPE HOLDING APPARATUS AND INSPECTING METHOD

[75] Inventors: Tsutomu Yamamoto, Tokyo; Minoru Okada, Sagamihara; Takakazu Ishigami, Tokyo; Nobuyuki Motoki, Tokyo; Eiichi Fuse, Tokyo; Masaaki Hayashi, Tokyo, all of Japan

[73] Assignee: Olympus Optical Co., Ltd., Tokyo, Japan

[21] Appl. No.: 865,254

[22] Filed: Apr. 8, 1992

Related U.S. Application Data

[63] Continuation-in-part of Ser. No. 412,078, Sep. 25, 1989, abandoned.

[30] Foreign Application Priority Data

Feb. 27, 1989 [JP] Japan .................................. 1-47868

[51] Int. Cl.$^5$ ............................................. G01B 11/02
[52] U.S. Cl. .................................................... 356/241
[58] Field of Search ............................ 356/241; 73/116

[56] References Cited

U.S. PATENT DOCUMENTS

| 3,690,775 | 9/1972 | Cousins | 356/241 |
| 4,078,864 | 3/1978 | Howell | 356/241 |
| 4,659,195 | 4/1987 | D'Amelio et al. | |
| 4,696,544 | 9/1987 | Costella | |
| 4,726,355 | 2/1988 | Okada | |
| 4,784,117 | 11/1988 | Miyazaki | |
| 4,784,463 | 11/1988 | Miyazaki | 356/241 |
| 4,860,732 | 8/1989 | Hasegawa et al. | 356/241 |

FOREIGN PATENT DOCUMENTS 61-294341 12/1986 Japan .

*Primary Examiner*—Richard A. Rosenberger
*Attorney, Agent, or Firm*—Armstrong, Westerman, Hattori, McLeland & Naughton

[57] ABSTRACT

An apparatus for holding an insertable part of an endoscope positioned in a combustion chamber of a reciprocating engine or rotary engine having ignition plug holes to observe the interior of the combustion chamber and an inspecting method are provided with a holding apparatus for stationarily holding the insertable part in the combustion chamber through a spark plug hole provided in the engine to insert a spark plug for a spark plug ignition into the combustion chamber.

28 Claims, 22 Drawing Sheets

FIG. 7
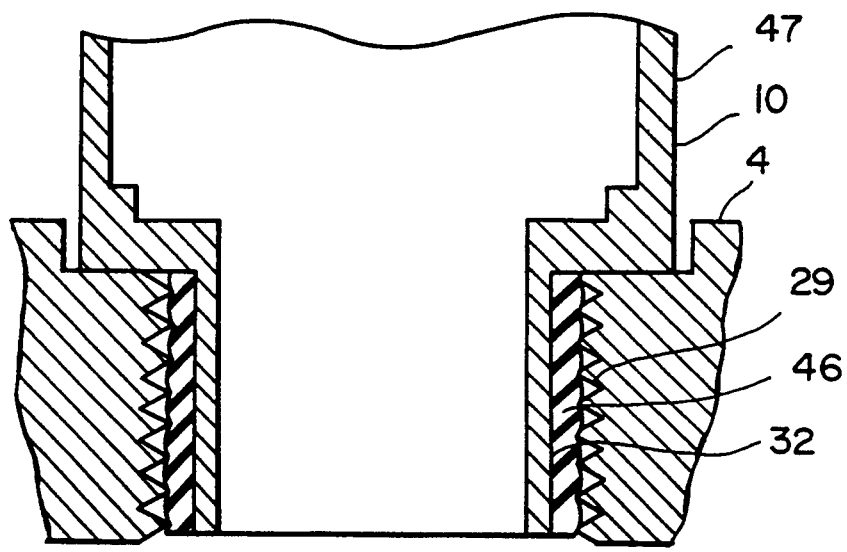
FIG. 9
FIG. 8
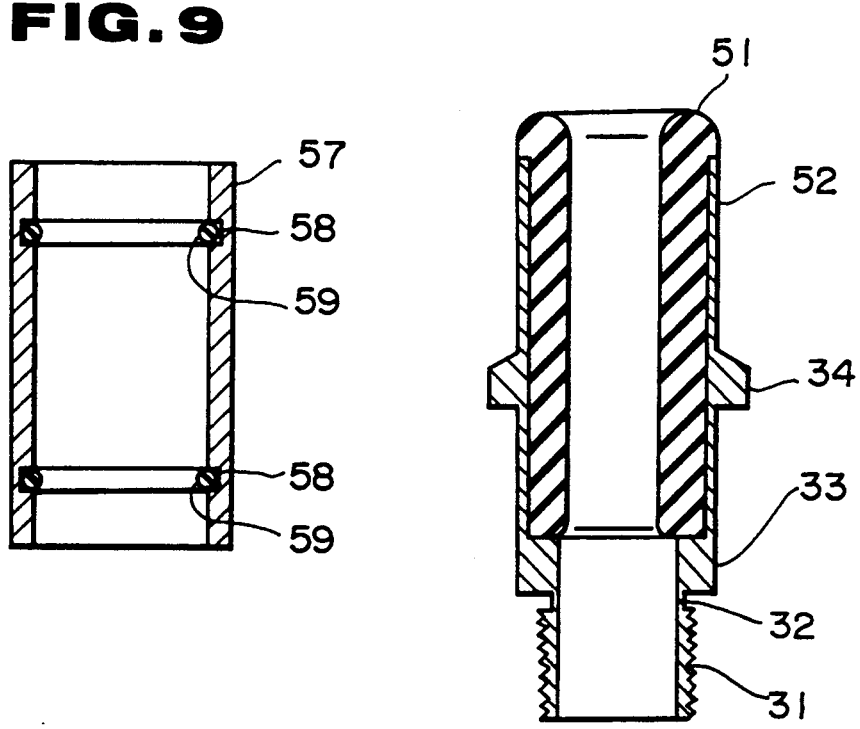

FIG.17
FIG.18
FIG.19
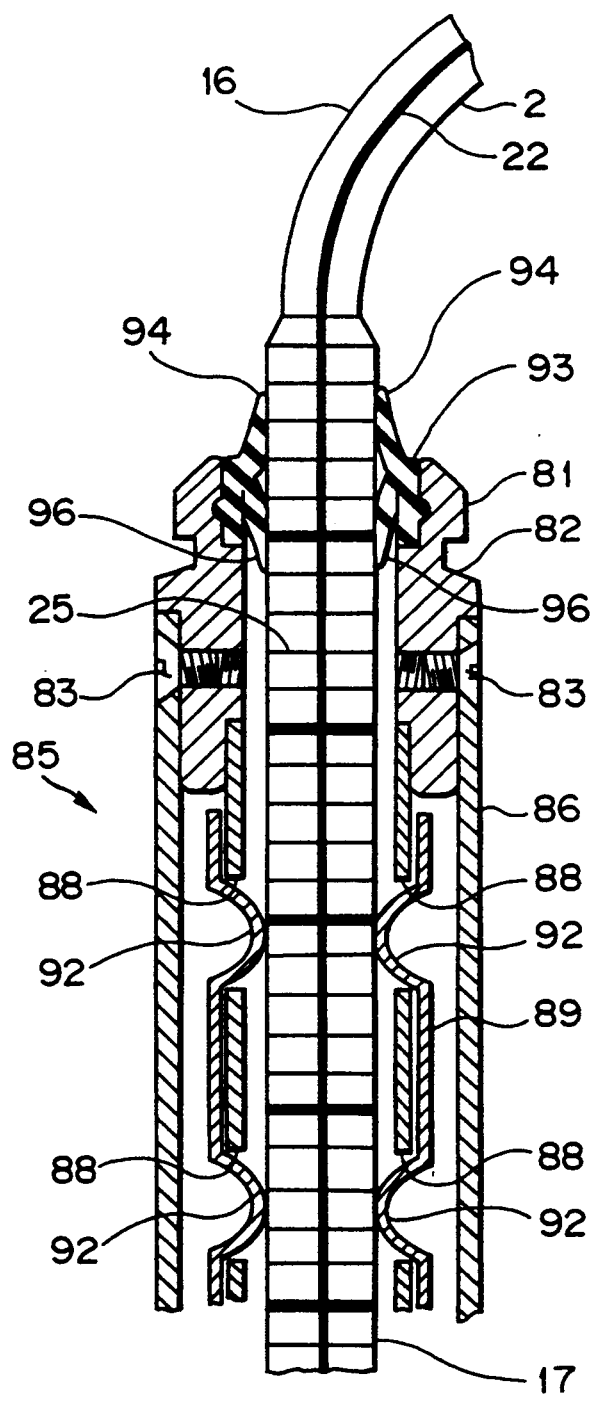
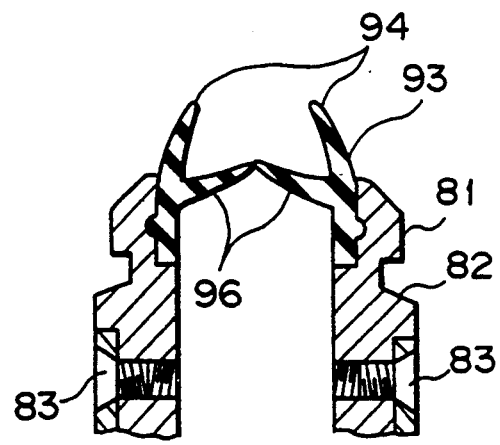
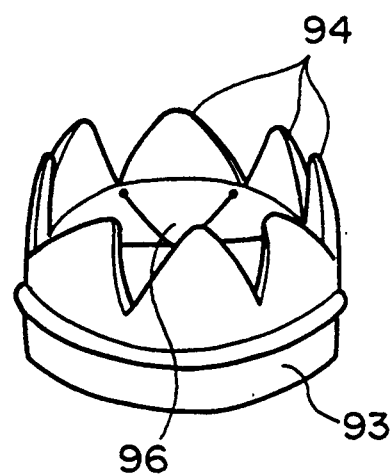

5,335,061

ENDOSCOPE HOLDING APPARATUS FOR INSPECTING THE INTERIORS OF A RECIPROCATING ENGINE AND ROTARY ENGINE HAVING IGNITION PLUG HOLES, ENDOSCOPE APPARATUS INCLUDING THE ENDOSCOPE HOLDING APPARATUS AND INSPECTING METHOD

This application is a continuation-in-part of application Ser. No. 412,078, filed Sep. 25, 1989 now abandoned.

BACKGROUND OF THE INVENTION

1. Field of the Invention

This invention relates to an endoscope apparatus for observing the interiors of a reciprocating engine and rotary engine having ignition plug holes.

2. Description of the Related Art

Recently, there extensively used an industrial endoscope whereby the interior of a boiler, turbine, engine or chemical plant can be observed and inspected by inserting an elongate insertable part into the interior.

The endoscope, particularly for engines, has been required to be able to inspect and determine whether the piston head is burned, the inside cylinder wall is scratched, impurities are deposited on the suction and exhaust valves or whether the gasket between the cylinder block and cylinder head is deformed, all without overhauling the combustion chamber of the engine on a large scale. In one method, the spark plug is removed and the endoscope is inserted into the combustion chamber through the hole to observe the interior. However, it has been difficult for one inspector to inspect the interior while stably holding the endoscope tip part in any desired stationary position.

In a publication of Japanese patent application laid open No. 294341/1986 is shown a method of inspecting suction and exhaust valves wherein, in an internal combustion engine having an exhaust valve and suction valve, an inspecting port, which can be opened and closed, is provided in an exhaust, or suction, path and an endoscope, utilizing a fiber-scope, or the like, is inserted through such inspection port to inspect the condition of the seat parts of a valve rod and valve seat.

SUMMARY OF THE INVENTION

An object of the present invention is to provide an endoscope holding apparatus whereby an endoscope tip part can be stably and stationarily held in any desired position within the combustion chamber of a reciprocating engine and rotary engine having ignition plug holes, in order to provide an endoscope apparatus and provide an inspecting method.

The endoscope holding apparatus of the present invention has a holding apparatus for holding in a stationary position, an endoscope insertable part led into the internal combustion engine through a spark plug hole in an internal combustion engine.

Also, the endoscope apparatus of the present invention comprises an endoscope having an insertable part having in the tip part an observing window for observing the interior of the combustion chamber and an illuminating window for illuminating the interior of the combustion chamber for insertion into the combustion chamber and an operating part connected at the other end of the endoscope to the insertable part, a holding apparatus for holding the insertable part fed into the combustion chamber through a spark plug hole and a light source apparatus connected to the endoscope and fed through the endoscope with an illuminating light for emitted light from the illuminating window.

Further, the inspecting method comprises the steps of removing the spark plug from the spark plug hole, inserting the insertable part of the endoscope through the spark plug hole and holding in a stationary position, the insertable part to position an observing window provided in the tip part of the insertable part within the combustion chamber.

BRIEF DESCRIPTION OF THE DRAWINGS

FIGS. 1 to 6 relate to the first embodiment of the present invention.

FIG. 1 is a view, partly in section, of an endoscope apparatus of the present invention.

FIG. 2 is an enlarged view of the lead end of the endoscope of FIG. 1 and showing the holding apparatus.

FIG. 4 is a perspective view of a fixing spring.

FIG. 5 is a view of an electronic endoscope apparatus.

FIG. 6 is a view of a rigid endoscope apparatus.

FIG. 7 is an enlarged view of a second embodiment of the present invention with an enlarged view of a spark plug female screw part.

FIG. 8 is a view, in section, of a third embodiment of the fixing tool of the present invention.

FIG. 9 is a view, in section, of a fourth embodiment of the invention.

FIG. 17 is a sectional view of the holding apparatus of the embodiment of FIG. 11 and fitted with a rubber member.

FIG. 18 is an enlarged sectional view of the rubber member of FIG. 17, with the endoscope removed.

FIG. 19 is a perspective view of the rubber member of FIG. 18.

DETAILED DESCRIPTION OF PREFERRED EMBODIMENTS OF THE INVENTION

The embodiments of the present invention are described in the following with reference to the drawings.

FIGS. 1 to 6 show the first embodiment of the present invention.

Figure 1:
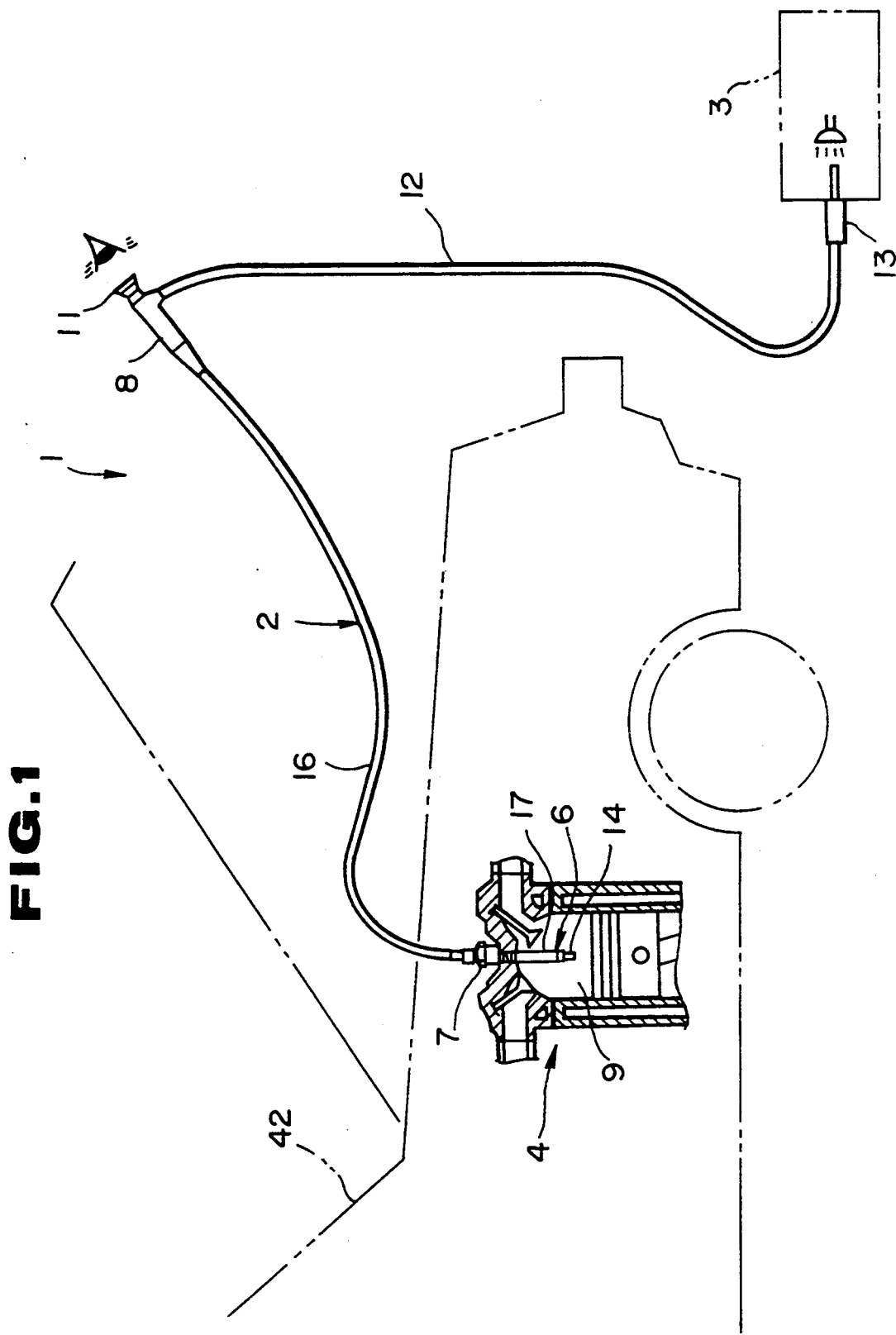

In FIG. 1, an engine 4 is fitted with a holding apparatus 7 by which the tip part of an insertable part 6 of an endoscope 2 is held with its leading end in combustion chamber 9. The endoscope 2 includes a light source apparatus 3 from which an illuminating light is fed through the endoscope.

Endoscope 2 has an operating part 8, connected to the above mentioned insertable part, at the rear end and is provided with an eyepiece part 11 through which combustion chamber 9 can be observed with a naked eye. Further, a light guide cable 12 through which a light guide, not illustrated, is inserted and extends out of the side of the operating part 8. At its rear end cable 12 is provided with a connector 13 which, when connected to the above mentioned light source apparatus 3, transmits an illuminating light output from the light source apparatus 3 into the combustion chamber 9.

The light source apparatus 3 is preferably anti-explosive. The power source may be either from an alternating current source or from a direct current source, such as a battery or car battery.

The insertable part 6 has a tip part 14 and flexible part 16. The tip part 14 has a tip body 17 formed of a rigid metal or the like. A tip attachment 20, FIG. 3A, whereby the visual field direction or view angle can be changed, is removably fitted to the front of tip body 17.

The tip body 17 may be formed of plastics.

Figure 3A:
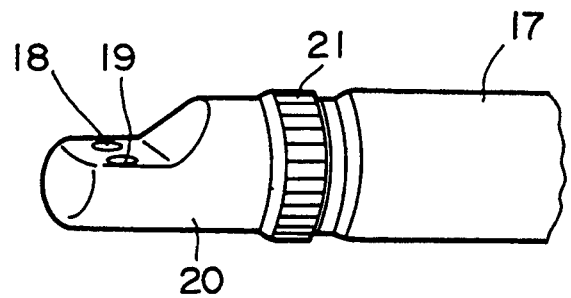
FIGS. 3A and 3B are enlarged explanatory views of attachments fitted to the lead end of the endoscope.

The above mentioned tip attachment 20, FIG. 3A, is a side viewing type tip attachment 20 provided on the outer peripheral wall with an objective lens system 18 and light distributing lens system 19 so that an observation in the direction at right angles with the tip body 17 inserting direction may be made. The objective lens system and light distributing lens system are provided in the same position with respect to the lengthwise direction axis to eliminate the parallax of the light distribution. The light distributing lens system 19 radiates the illuminating light output from the above mentioned light source apparatus 3 into the combustion chamber 9, the tip body 17 is provided with a rotatable knurled ring 21 so that, when this knurled ring 21 is rotated, the threaded part of the tip attachment 20 and the threaded part of the knurled ring 21 are threaded with each other to fix the tip attachment 20 to the tip body 17.

Figure 3B:
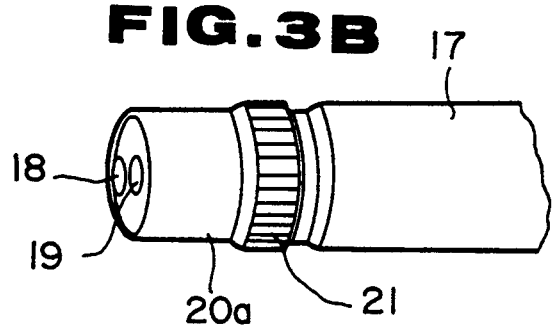

Also, in place of the side viewing type tip attachment shown in FIG. 3A, a straight viewing type tip attachment 20a shown in FIG. 3B may be fitted to the tip body 17 in the same manner. This straight viewing type tip attachment 20a is provided on the tip surface with the objective lens system 18 and light distributing lens system 19 so that the inserting direction of the tip body 17 may be observed. An oblique viewing type tip attachment may also be provided.

Figure 2:
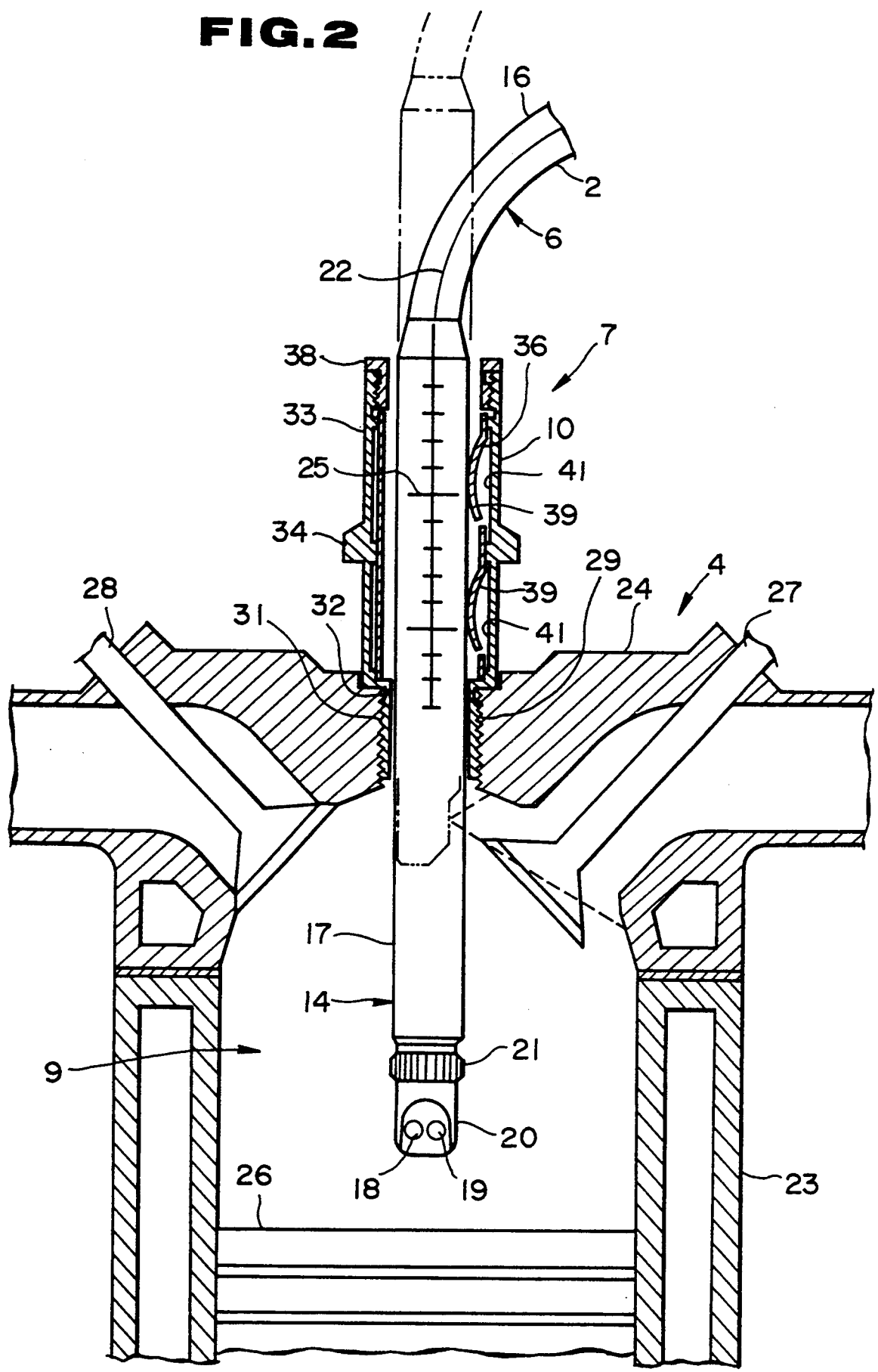

On the outer peripheral surface of the rear part of the tip body 17, an observing direction indicating line 22, FIG. 2, is provided in the position coinciding with the observing direction of the lens systems 18 and 19 of the side viewing or oblique viewing tip attachment 20 in the lengthwise direction of the insertable part 6 so as to lead to the flexible part 16. Further, an inserted depth scale 25, by which the inserted depth of the tip body inserted into the combustion chamber 9 can be measured, is provided on observing direction indicating line 22. By means of these observing direction indicating line 22 and inserted depth scale 25, the inspector can determine the observing direction and position within the combustion chamber 9.

The entrance end surface of an image guide, not illustrated, is provided in the image forming position of the above mentioned objective lens system 18. Such image guide is inserted through the insertable part 6 so as to transmit an observed image to the above mentioned eyepiece part 11. The length of the image guide is, for example, 70 cm., the number of the image guide fibers is 20,000 fibers and the view angle of the objective lens system is 80 degrees.

The engine 4, in FIG. 2, is formed of a cylinder block 23, cylinder head 24 and piston 26. The cylinder head 24 is provided with an intake valve 27 and exhaust valve 28. A spark plug fixing female screw part 29 in a spark plug hole into which a spark plug, not illustrated, is to be threaded is provided between the intake valve 27 and exhaust valve 28 in the upper part of the cylinder head 24. A fixing tool body 10 is threaded into female threaded part 29. Fixing tool body 10 is substantially cylindrical and has a small diameter part 32 on which a male threaded part 31, as a second fixing means, threaded with the above mentioned female threaded part 29 is provided and has a large diameter part 33 outside the combustion chamber 9 above small diameter part 32. A hexagonal nut part 34 is formed in the middle part on the outer periphery of the large diameter part 33 and is of the same contour as of the nut part of the spark plug so that a plug wrench for removably fitting the spark plug may be used.

It is desirable that the maximum outside diameter of the holding apparatus 7 not exceed the outside diameter of the plug wrench for removably fitting the spark plug, because so many various component parts are usually arranged around the engine or plug of the car that it is not easy to have the endoscope 2 approach the plug fixing female screw part 29. Generally, however, the engine is so designed that the plug may be removed and fitted without disassembling the other parts, that is to say, a space large enough for the plug wrench to engage the plug. Therefore, if the holding apparatus 7 does not exceed the thickness of the plug wrench, it can be readily removably fitted. In this embodiment, the largest outside diameter part of the holding apparatus 7 is the nut part 34 which is of the same shape as the hexagonal shape of the spark plug. Therefore, the holding apparatus 7 can be easily removably fitted to the plug fixing female screw part 29, the same as the spark plug, with an ordinary spark plug wrench. Through not illustrated, if a magnet is used in the above mentioned hexagonal nut part, the plug wrench and holding apparatus will become integral so as to be easy to fit and remove.

Figure 4:
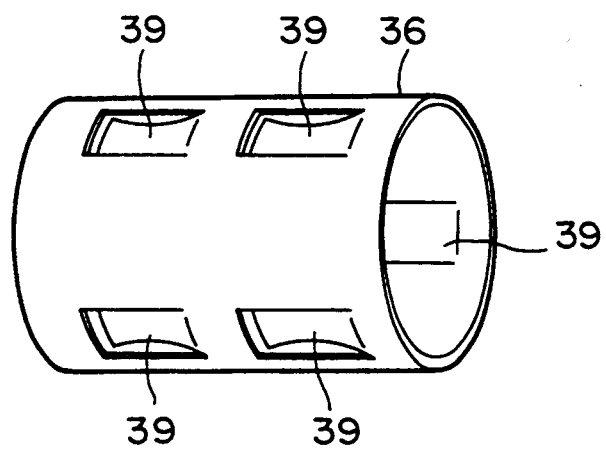

Substantially cylindrical fixing spring 36 as a first fixing means, as is shown in FIGS. 2 and 4, is rotatably inserted into the fixing tool body 10 and is prevented, by an annular fitting ring 38 threaded on the inner peripheral surface of the upper part of the fixing tool body 10, from dropping out. Grooves 41 are annularly provided on the inner peripheral wall of the fixing tool body 10 so that the contact surface between the fixing spring 36 and the inner peripheral surface of the fixing tool body 10 may be reduced and, in the case that the fixing spring 36 rotates within the fixing tool body 10, the friction force may be reduced as much as possible.

As shown in FIG. 4, a total of six plate spring parts 39, in two rows in the lengthwise direction and at three places in the peripheral direction, are incised on the peripheral wall of the fixing spring 36 and are formed to be substantially arcuate so as to project, as curved, on the inside diameter side to press, with a proper force, the outer peripheral wall of the tip body 17 inserted through the fixing spring 36. The force pressing the tip body 17 of this fixing spring 36 is of such magnitude that, in case the hand is released from the tip body 17, it may not drop down and that, in case the tip body 17 is to be moved by hand, it may be moved without any difficulty.

In the case of rotating the tip body 17, that is, in the case of changing the observing direction, when the operating part 8 is twisted, the tip body 17 and fixing spring 36 will correspondingly rotate with respect to the fixing tool body 10.

The tip body 17, in contact with the fixing spring 36, may be of such material having a proper hardness as, for example, stainless steel or plastics so as to show a stabilized moving resistance. Also, the tip body 17, in contact with the fixing spring 36, may be of a minimum length required to observe the interior of the combustion chamber 9 so as to be easy to insert into the combustion chamber 9.

The operation of the holding apparatus formed as mentioned above shall be explained.

The spark plug, fitted to the engine 4 of an automobile 42, is removed and the fixing tool body 10 is threaded into the spark plug fixing female screw part 29 and is fixed with a plug wrench. The tip adapter 20, FIG. 3A, or 20a, FIG. 3B, is selected, depending on what position, within the combustion chamber, is to be observed, and is fixed to the tip body 17. Then, the tip body 17 is inserted into the fixing tool body 10, to the most proper position, by hand while observing the inserted depth scale 25 of the tip body 17. With the insertion, the tip body 17 presses and energizes the fixing spring 36 on the plate spring parts 39 and tip body 17 is inserted into the combustion chamber 9. With the energizing force of the plate spring parts 39, the tip body 17 will not drop down even in case the hand is released from it and can be inserted and pulled out without any difficulty.

In case such inserted depth, as is shown by two-point chain lines in FIG. 2 and the side viewing type tip attachment 20 are selected, the back side of the suction valve 27 or exhaust valve 28 and the upper inside surface of the combustion chamber 9 can be able to be observed. The inspector observes the interior of the combustion chamber 9 from the eyepiece part 11. In case the periphery of the upper part of the inside wall of the combustion chamber 9 is to be observed, the operating part 8 is twisted and the contact part of the fixing spring 36, with the fixing tool body 10, slides and the tip body 17 is rotated together with the fixing spring 36 and the peripheral wall is observed. In this case, by observing the observing direction indicating line 22, the inspector can easily determine what position, within the combustion chamber 9, is being observed.

In the case where the lower part of the combustion chamber 9 is to be observed, the tip body 17 is further pushed down. In the case of changing the visual field direction, the tip body 17 is pulled out, the tip attachment 20 is replaced and tip body 17 is again inserted into the fixing tool body 10.

In the case of inspecting the upper surface of the piston 26, the tip body 17 is pulled out, is fitted with the straight viewing type tip attachment 20a and is reinserted into the fixing tool body 10.

On the other hand, also in case the observation magnification is wanted to be changed, once the tip part body 17 is pulled out, lens 18 may be replaced with a lens of the desired magnification.

As described above, according to this embodiment, the tip body 17 is held by the fixing spring 36 and therefore can be stably and stationarily held in any desired position within the combustion chamber 9 of the engine 4.

Also, in the embodiment, if it is selected to observe the piston head by the straight viewing, the back sides of the suction valve 27 and exhaust valve 28 by the side viewing and the inside wall surface of the cylinder by the side viewing, they will be able to be observed at the best angle. In the case of an engine which is not of a center plug type, in which the center axis of the cylinder the center axis of the female screw part 29 coincide with each other, as in FIG. 2, the observation will be possible by using the oblique viewing type tip adapter.

In this embodiment, the straight viewing and side viewing observations can be made by selecting the tip adapters 20 and 20a. The straight viewing, oblique viewing and side viewing may be continuously obtained by moving the lens system. Also, rear oblique viewing may be made. Further, the visual field angle, brightness (F No.) and photographed field depth may be, respectively, set at the optimum values by the respective visual field directions.

By the way, at present, plug fixing threads M12 and M14 are commonly used. An M12 fixing tool and M14 fixing tool, different only in the male thread part 31, may be prepared so as to be used in either of the engines and may be replaced and used in one endoscope.

Also, two endoscopes, for M12 and M14 for threads, may be prepared. In this case, in the endoscope for M14, the insertable part can be made large in diameter. Therefore, the picture quality and brightness of the observed image can be improved. Further, a fixing tool having another male thread part, rather than metric screw threads, may be prepared.

Figure 5:
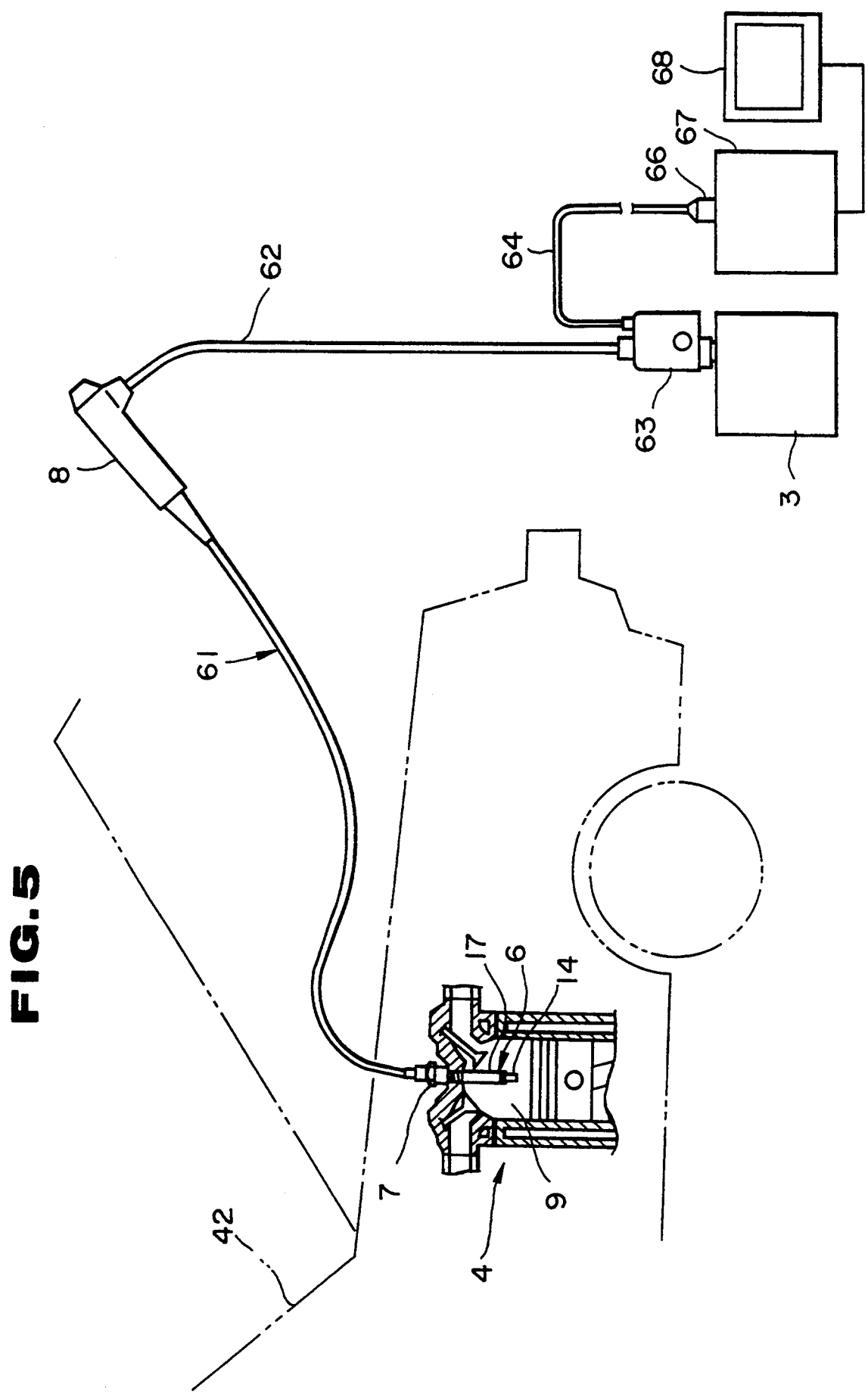

In this embodiment, an optical endoscope, having an image guide, has been described but such electronic endoscope as is shown in FIG. 5 may also be used.

In FIG. 5, the same as in the above mentioned endoscope 2, an electronic endoscope 61 has the insertable part 6 provided with the tip body 17 and the operating part 8 connected to this insertable part 6. A universal cord 62 is extended out of the operating part 8 and alight source connector 63 provided at the tip of this universal cord 62 is connected to a light source apparatus 3. A signal cable 64 is extended out of the light source connector 63 and a signal connector 66 provided at the tip of this signal cable 64 is connected to a video processor 67 which is connected to a monitor 68.

A solid state imaging device, not illustrated, is provided within the above mentioned tip body 17 so that an object image, obtained from the objective lens system 18, may be formed on this solid state imaging device. The solid state imaging device photoelectrically converts the object image to an electric signal and outputs it to the video processor 67, through the universal cord 62 and signal cable 64. The video processor 67 processes the input electric signal, as predetermined to be a video signal, and outputs the video signal to the monitor 68 which displays the object image.

When an inspection is thus made with the electronic endoscope 61, the inspection of the inspected part is simply recorded by a video tape recorded, or the like.

Figure 6:
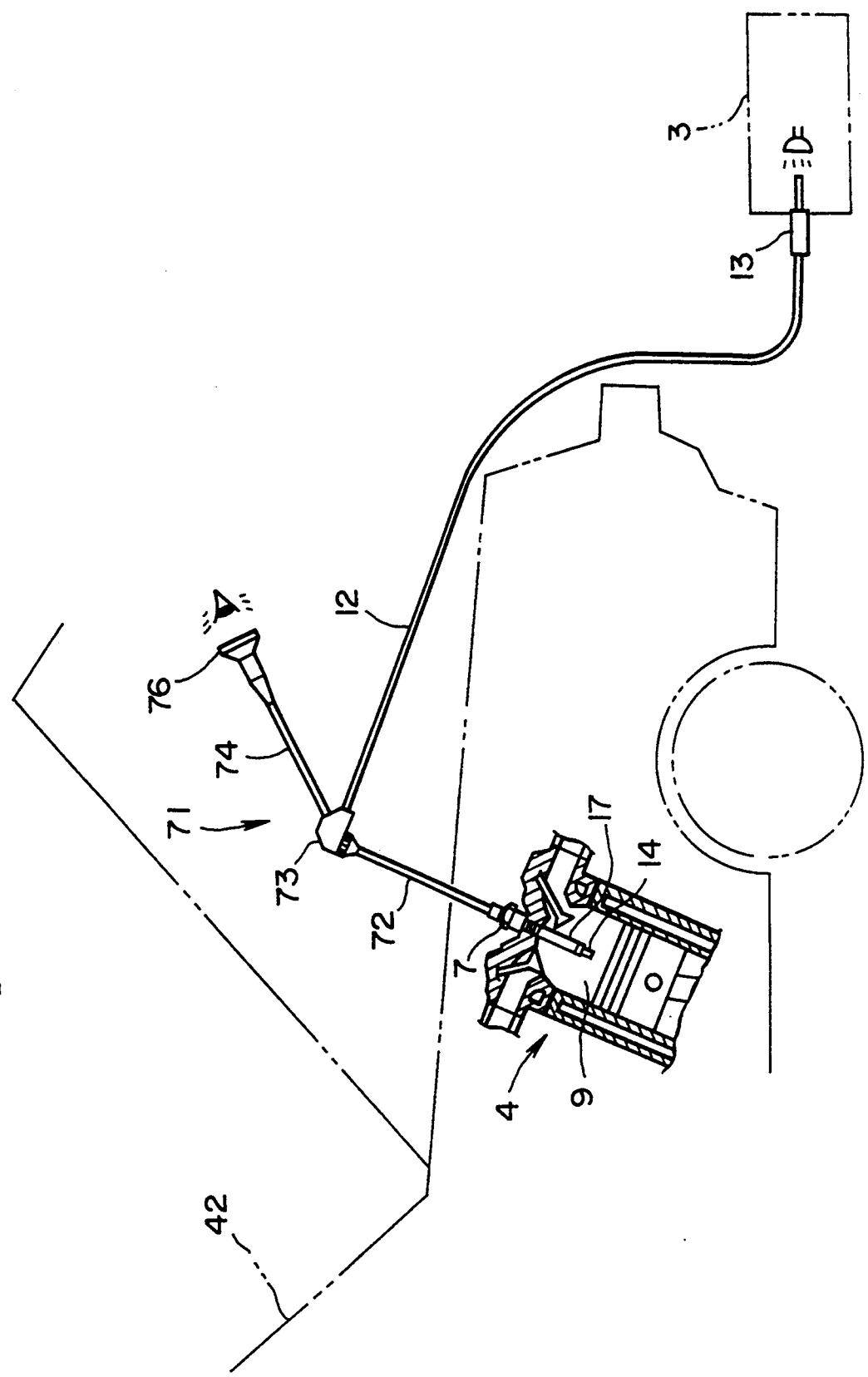

Also, the above mentioned endoscopes 2 and 61 have the flexible insertable parts 6 but a rigid endoscope may be used as shown in FIG. 6.

In FIG. 6, a rigid endoscope 71 has an insertable part 72 provided with the tip body 17 and an operating part 73 is connected to this insertable part 72 at the rear end. An image guide pipe 74 and light guide cable 12 are extended out of the gripping part 73. The image guide pipe 74 is provided, at the rear end, with an eyepiece 76. The light guide cable 12 is provided, at the rear end, with a connector 13 connected to the light source apparatus 3.

An image guide, or relay lens, not illustrated, is inserted through the above mentioned image guide pipe 74 so that an object image, obtained from the objective lens system 18, may be transmitted to the eyepiece 76.

The insertable part 72 is provided, rotatably, with respect to the operating part 73 so that the observing direction, within the combustion chamber 9, may be changed by rotation.

FIG. 7 shows the second embodiment of the present invention.

In this embodiment, such elastic member 46 as, for example, of rubber as a second fixing means is provided instead of the male threaded part 31 provided in the small diameter part 32 in the first embodiment. The other formations are the same as in the first embodiment, bear the same reference numerals and shall not be explained.

An elastic member 46 having such elasticity as, for example, of rubber and formed to be cylindrical is externally fitted and fixed to the small diameter part 32 in a fixing tool 47 of this embodiment. This elastic member 46 is of an outside diameter somewhat larger than the inside diameter of the spark plug fixing female threaded part 29, so as to be energized when inserted into the female threaded part 29. By this energizing force, the fixing tool 47 is fixed to the engine 4.

In this embodiment, the fixing tool 47 is fixed to the engine 4 by elastically deforming the elastic member 46 and therefore can be easily fitted and removed.

The other operations and effects are the same as in the first embodiment.

FIG. 8 shows the third embodiment of the present invention.

In this embodiment, an elastic member 51 is provided instead of the fixing spring 36 in the first embodiment and the fitting spring 38 is omitted. The other formations are the same as in the first embodiment, bear the same reference numerals and shall not be further explained.

In the embodiment of FIG. 8, the elastic member 51 as a first fixing means formed to be cylindrical, for example, of rubber, is internally fitted and fixed in a fixing tool body 52 and is of an inside diameter somewhat smaller than the outside diameter of the tip body 17 so as to be expanded in the diameter and generate an energizing force when the tip body 17 is inserted. By this energizing force, the tip body 17 can be stably and stationarily held.

In this embodiment, some resisting force will be produced in case the tip body 17 is rotated but the formation is simpler than in the first embodiment.

FIG. 9 shows the fourth embodiment of the present invention.

In this embodiment, a fixing member 57 is provided instead of the fixing spring 36 in the first embodiment. The other formations are the same as in the first embodiment, bear the same reference numerals and shall not be further explained.

The fixing member 57 in this embodiment is formed to be cylindrical and is provided rotatably within the fixing tool body 10 as in the first embodiment. O-ring grooves 58 fitted, respectively, with O-rings 59 as a first fixing means are annularly provided in upper and lower places on the inner peripheral surface of fixing member 57. These O-rings 59 are of an inside diameter somewhat smaller than the outside diameter of the tip body 17 so as to be expanded in diameter and energized when the tip body 17 is inserted into the fixing member 57. By this energizing force, the tip body 17 can be stably and stationarily held.

In this fourth embodiment, as the fixing member 57 is rotatably provided within the fixing tool body 10, the tip body 17 can be easily rotated. That is to say, the observing direction can be easily changed.

The other operations and effects are the same as in the first embodiment.

Figure 10:
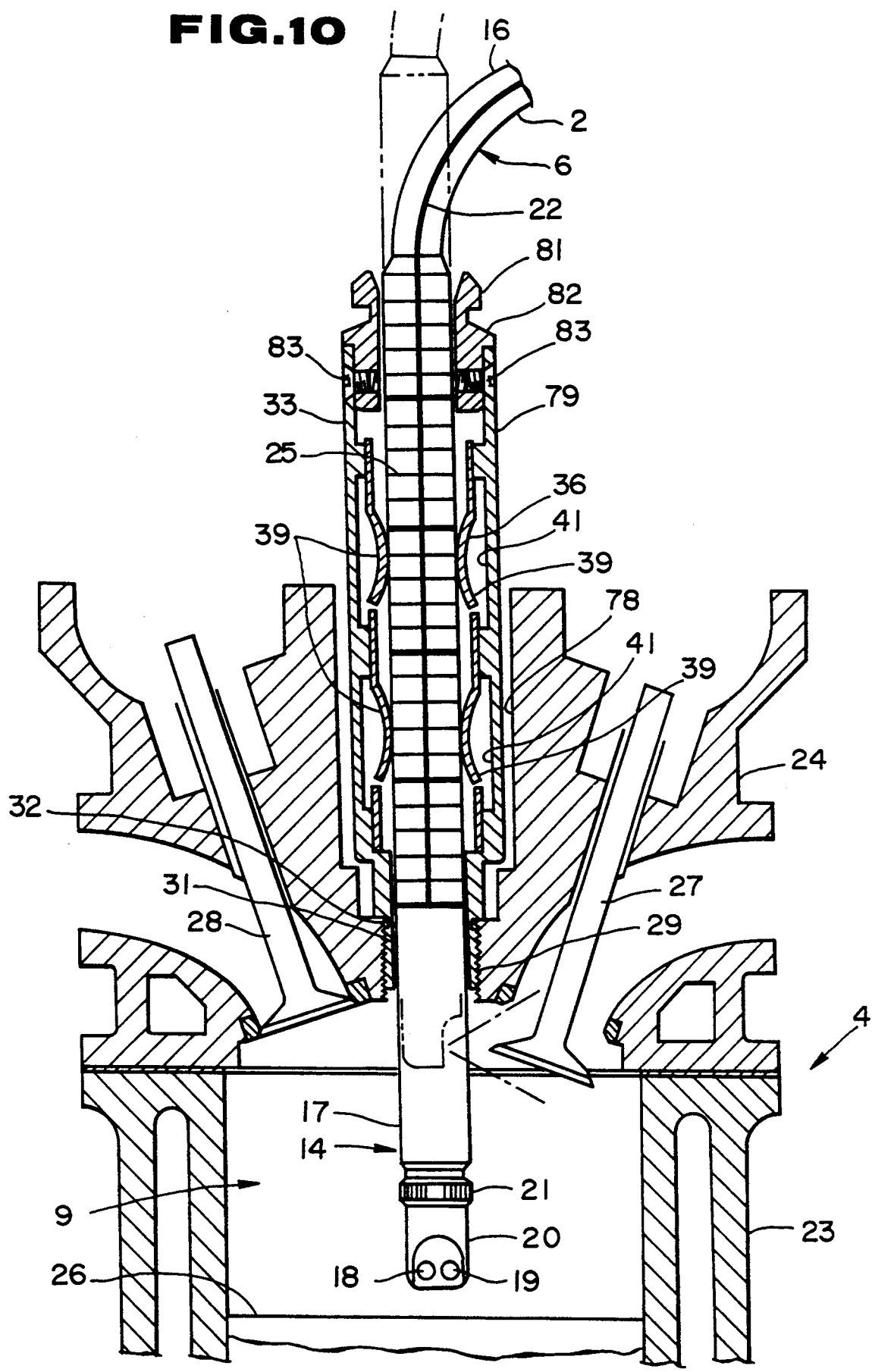
FIG. 10 is a view, partly in section, of a fifth embodiment of the endoscope holding apparatus of the invention.

FIG. 10 shows the fifth embodiment of the present invention.

This embodiment is a holding apparatus to be used for an overhead cam shaft type engine in which a cam shaft is arranged on a cylinder head.

The same component members as in the first embodiment shall bear the same reference numerals and shall not be further explained.

In the overhead cam shaft type engine, a space for housing the cam shaft is provided in the upper part of the cylinder head 24 and, therefore, the spark plug fixing female screw part 29 is positioned deep in a spark plug inserting hole 78. In this case, if the nut part 34 is provided on the periphery of the fixing tool body 10 as in the first embodiment, the nut will contact the inserting hole 78 and the fixing tool body 10 will not be able to be inserted. Therefore, in this embodiment, the nut part 34 is not formed on the periphery of a fixing tool body 79 but, instead, a cap 82 is fixed with screws 83 in the upper part of the fixing tool body 79 exposed out of the inserting hole 78 and a nut part 81 is formed on cap 82.

Also, the fixing tool body 79 is formed to be longer than the fixing tool body 10 in the first embodiment so as to be insertable into the deep inserting hole 78.

The spark plug inserting hole 78 forms a spark plug hole together with the spark plug fixing female threaded part 29.

The other formations and operations are the same as in the first embodiment.

In this fifth embodiment, the fixing tool body 79 is not provided on the outer periphery with the nut part 34, is formed to be long, and therefore, can be used even for an overhead cam shaft type engine.

The other effects are the same as in the first embodiment.

FIGS. 11 to 26 show the sixth embodiment of the present invention.

The holding apparatus in the sixth embodiment can be used for the overhead cam shaft type engine described in the fifth embodiment.

The holding apparatus 85, in the sixth embodiment, is provided with a substantially cylindrical elongate fixing tool body 86 as a holding means. This fixing tool body 86 is provided in the lower part with a male threaded part 31 as a second fixing means threaded into the spark plug fixing female threaded part 29.

A cap 82, having a nut part 81 formed to be hexagonal, is fixed with screws 83 to the above mentioned fixing tool body 86 in the upper part. Within the fixing tool body 86, a cylindrical pipe member 87, shown in FIG. 14, is rotatably supported in the upper part on the inner peripheral surface of the cap 82 and in the lower part on the inner peripheral surface of the fixing tool body 86.

Figure 14:
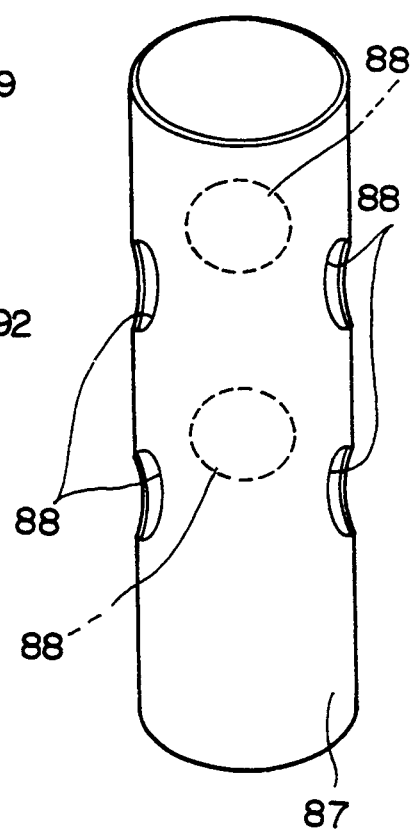
FIG. 14 is an enlarged view of a pipe member of the embodiment of FIG. 11.
Figure 15:
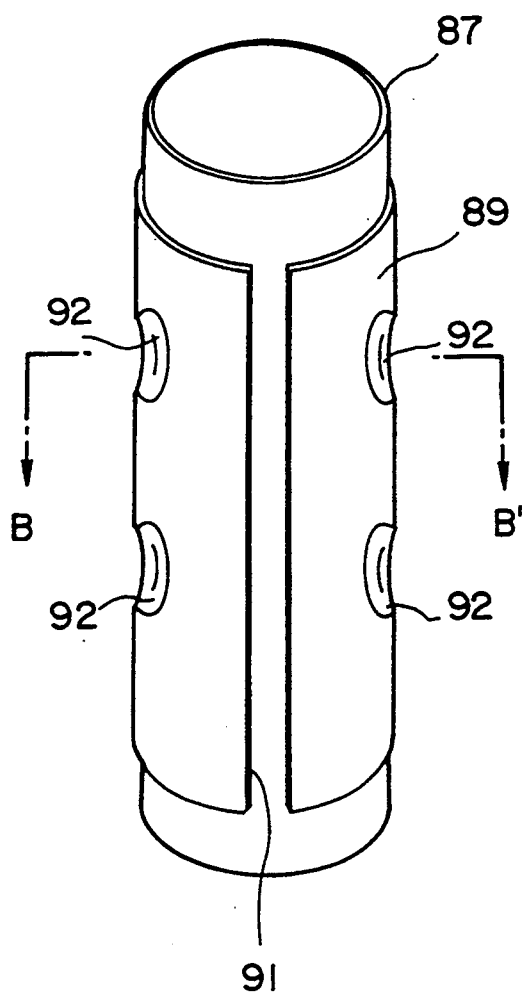
FIG. 15 is an enlarged view of the spring member and pipe member assembly of the embodiment of FIG. 11.
Figure 16:
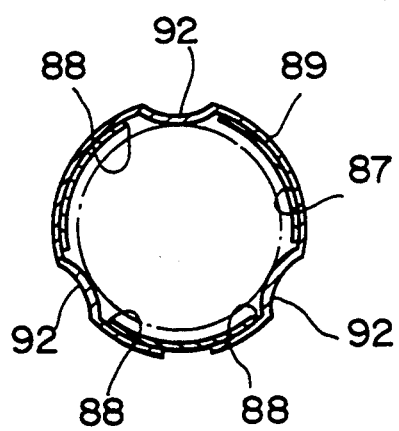
FIG. 16 is a sectional view taken at B—B' in FIG. 15.

In FIG. 14, the pipe member 87 is provided on the peripheral wall with a plurality of holes 88.

Figure 12:
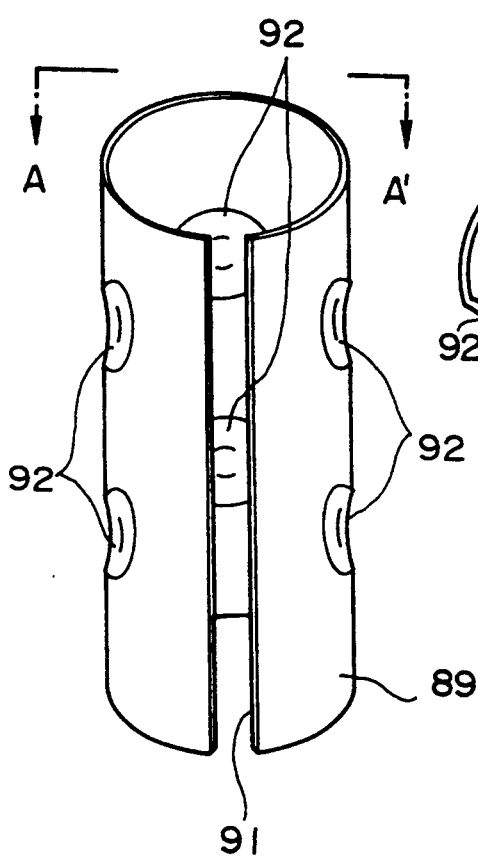
FIG. 12 is an enlarged view of a spring member of the embodiment of FIG. 11.
Figure 13:
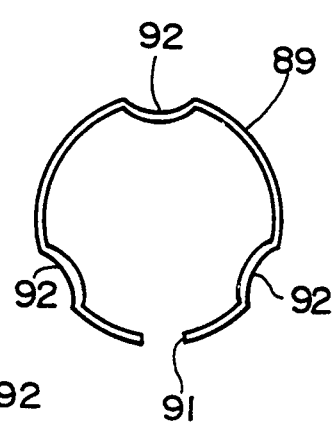
FIG. 13 is an end view as seen in the direction A—A' in FIG. 12.

A spring member 89, shown in FIG. 12, provided on the periphery of the above mentioned pipe member 87, has a slit 91 in the lengthwise direction and is provided on the peripheral wall with a plurality of projections 92 projecting in the inside diameter direction in the positions corresponding to the holes 88 in the above mentioned pipe member 87. When the tip body 17 is not inserted, the spring member 89 will be energized to press the pipe member 87 on the outer peripheral wall as in FIG. 16 and the inside contact circle diameter of the plurality of projections 92 will be smaller than the outside diameter of the tip body 17.

The pipe member 87 and spring member 89 form a first fixing means.

The other formations are the same as in the first embodiment.

In the fifth embodiment, when the cap 81 is gripped by a wrench and twisted on the hexagonally formed nut part 81, the fixing tool body 86 will be fixed to the engine 4. When the tip body 17 is inserted into the fixed fixing tool body 86, the tip body 17 will contact on the outer peripheral wall with the projections 92 projected out of the respective holes 88 of the pipe member 87 and will push and expand the projections 92 in the outside diameter direction. The reaction of this pushing and expanding force will become a holding force holding the spring member 89 in the tip body 17. As the projections 92 are fitted in the respective holes 88, the spring member 89 will be held by the pipe member 87 which is held by the cap 82 and fixing tool body 86 on the inner peripheral walls. In case the observing direction is to be changed, when the tip body 17 is twisted, it will rotate together with the pipe member 87 and spring member 89 with respect to the fixing tool body 86.

The other operations are the same as in the first embodiment.

In this fifth embodiment, the spring is not plate-like as in the first embodiment and therefore is not likely to break and drop.

The other effects are the same as in the first embodiment.

In FIG. 17, the cap 82 is provided on the inner peripheral surface with a dust preventing rubber member 93 which is substantially ring-like and is provided with a plurality of upper lips 94 extending upward and a plurality of diametral direction lips extending in the inside diameter direction for preventing dust and foreign matter from entering the engine. The diametral direction lips 96 will close the inserting path through which the tip body 17 is to be inserted as shown in FIG. 18 when the tip body 17 is not inserted but will close the gap between the tip body 17 and cap 82 together with the upper lips 94 as in FIG. 17 when the tip body 17 is inserted.

Thus, the rubber member 93 prevents dust, and the like, from entering the engine 4 in case where the tip body 17 is inserted or is not inserted.

Also, as in FIGS. 20 to 23, the lid 97, when in place, prevents dust and the like from entering the engine 4.

Figure 20:
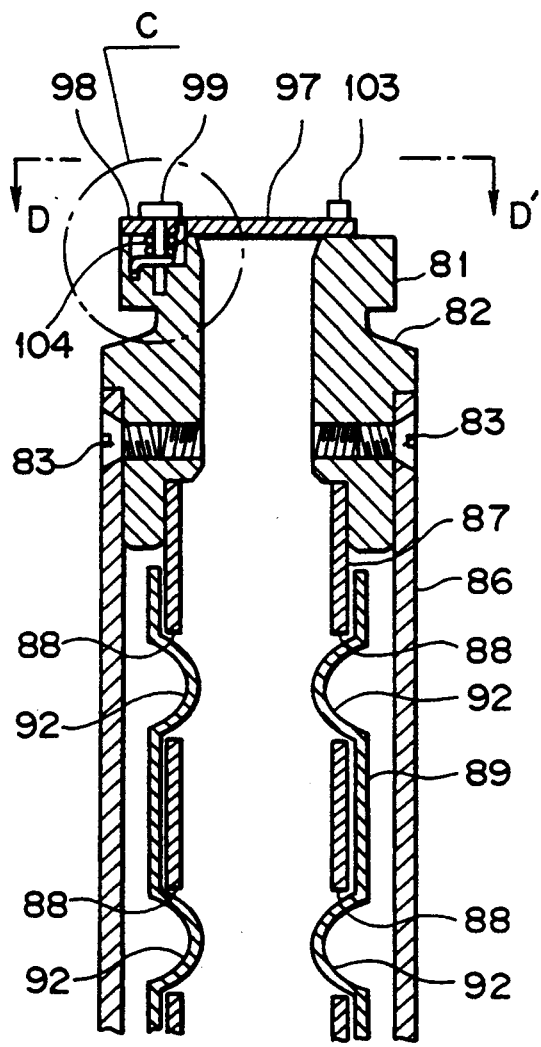
FIG. 20 is a view of a holding apparatus of the embodiment of FIG. 11 with the endoscope removed and a lid applied.
Figure 21:
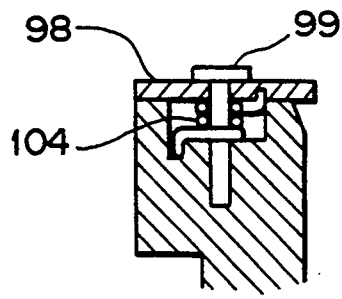
FIG. 21 is a detailed view of a part C in FIG. 20.
Figure 22:
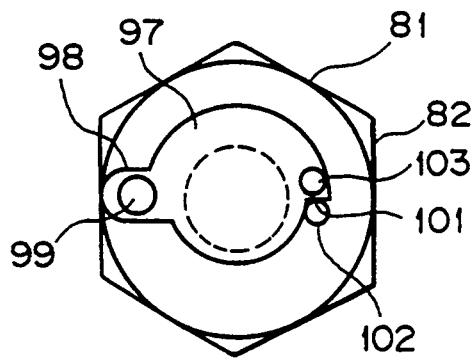
FIG. 22 is a view of the holding apparatus of FIG. 20 in the direction D—D', FIG. 20.
Figure 23:
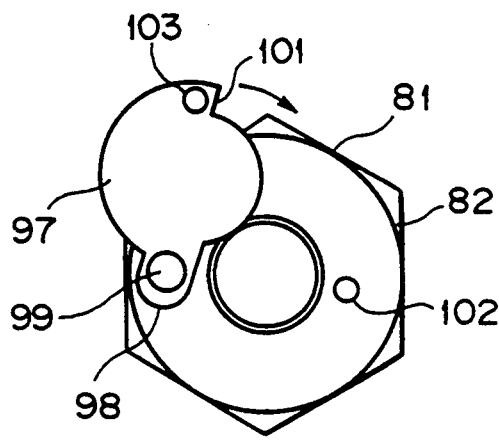
FIG. 23 is a view similar to FIG. 22 but with the lid opened.

In FIG. 20, the cap 82 is provided on the upper surface with a lid 97 closing the inserting path through which the tip body 17 is to be inserted. A pin 99 on the cap 82 is passed through a projection 98 provided on the peripheral edge of the lid 97 and forms a rotary fulcrum for the lid. A pawl 101 is formed on the peripheral edge of the lid opposite to projection 98 and engages a pin 102 on the cap 82. A handle 103 is provided near the pawl 101 of the lid 97.

A coil spring 104, fixed at one end to the cap 82 and at the other end to the lid 97, is wound on pin 99 and biases pin 102 and pawl 101 into engagement.

In the case of inserting the tip body 17, the handle 103 is held and the lid 97 is rotated counter-clockwise, with the pin 99 as a fulcrum, against the energizing force of the coil spring 104. Tip body 17 is then inserted into the fixing tool body 86.

After the insertion, the handle 103 is released and the observation of the cylinder interior, through the endoscope, is made. In case the observation ends, the tip body 17 is pulled out of the fixing tool body 86 and lid 97 is rotated clockwise, as in FIG. 23, with the pin 99 as a fulcrum, by the energizing force of the coil spring 104 and the pawl 101 engages pin 102.

The lid 97 does not close the gap between the fixing tool body 86 and tip body 17 when the tip body 17 is inserted in tool body 86 but closes the inserting path and prevents dust and the like from entering the engine 4 when tip body 17 is removed from tool body 86.

Figure 11:
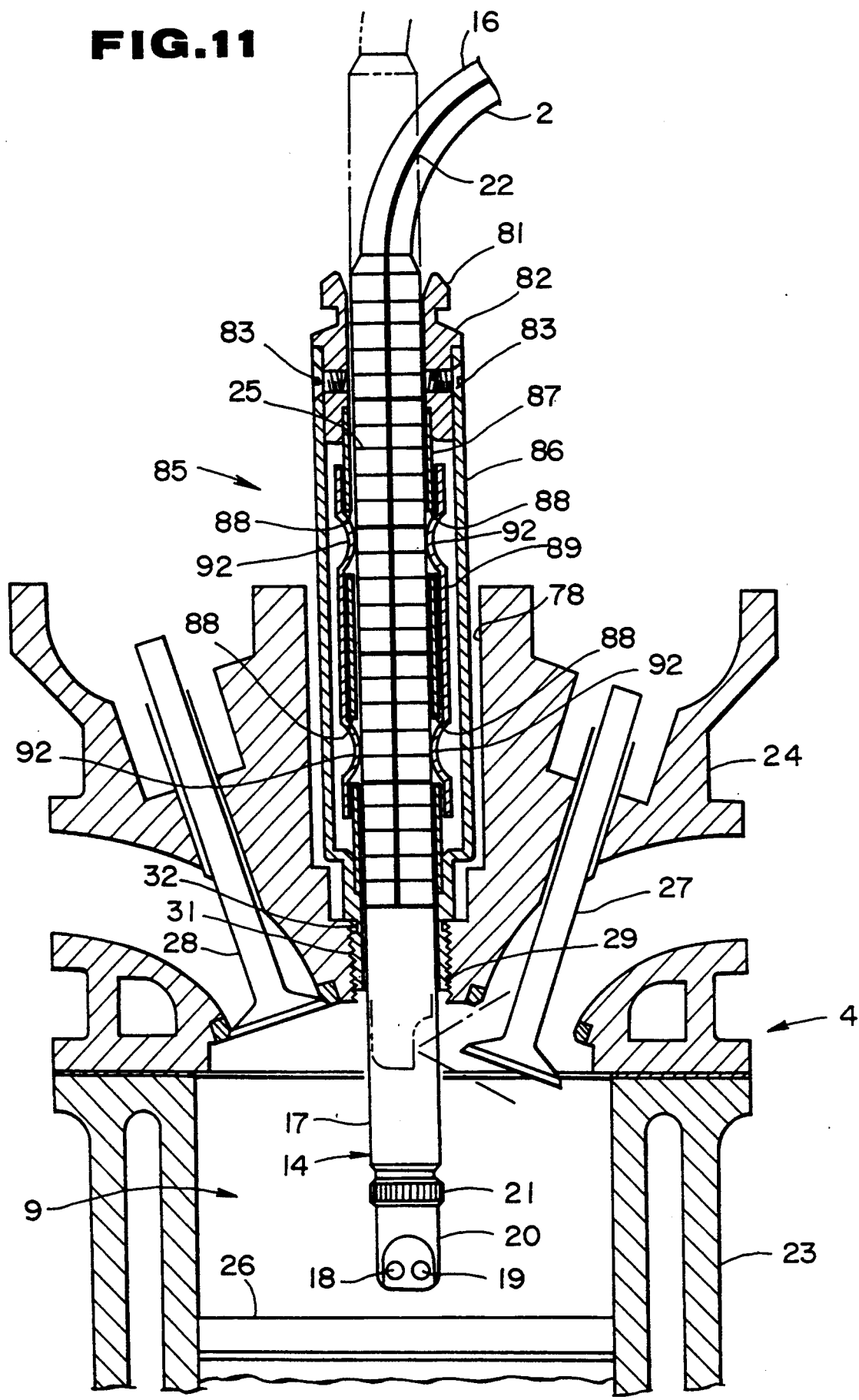
FIG. 11 is a view, partly in section, of an endoscope holding apparatus of the sixth embodiment of the present invention.
Figure 24:
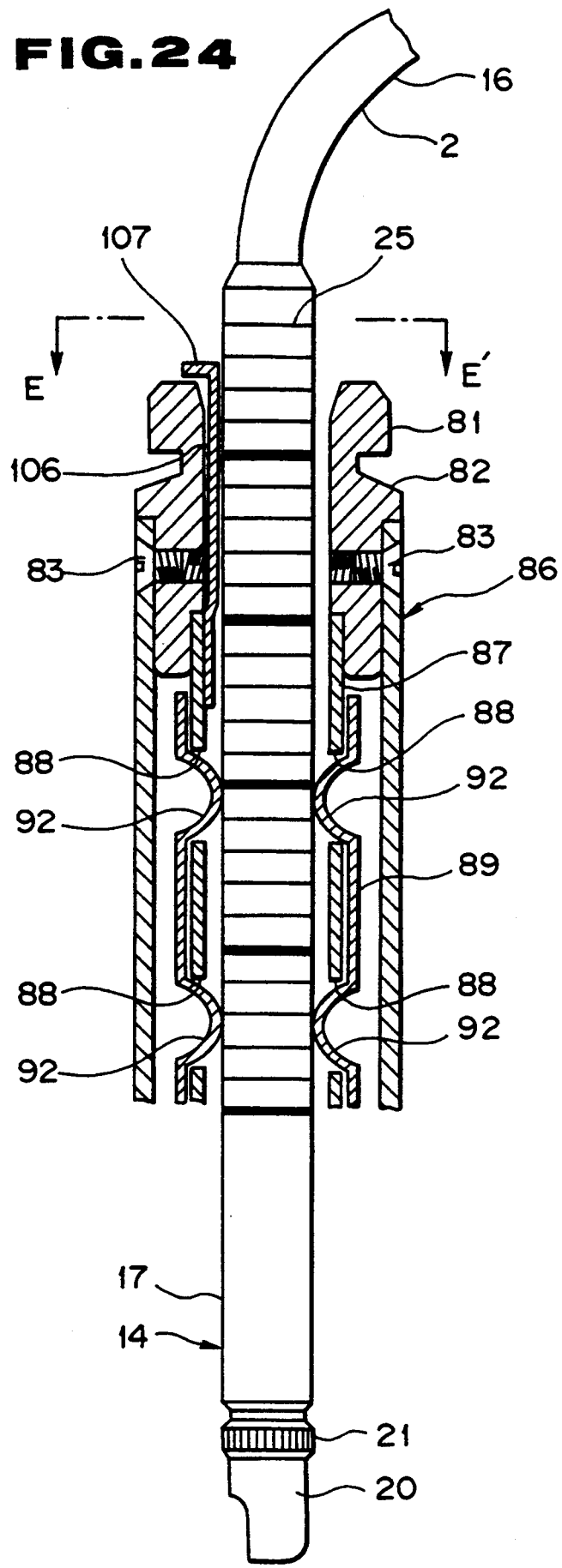
FIG. 24 is a view of a holding apparatus of the embodiment of FIG. 11 and having an observing direction indicating member.
Figure 25:
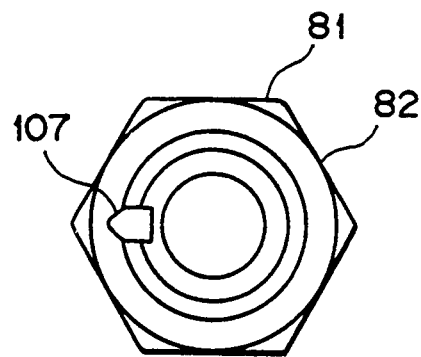
FIG. 25 is a view taken at E—E', FIG. 24.

In FIG. 24, an observing direction indicating member 106 is provided in place of the observing direction indicating line 22 provided in the lengthwise direction of the tip body 17 shown in FIG. 11.

The above mentioned observing direction indicating member 106 is elongate plate-like, is inserted in the lengthwise direction int eh gap between the tip body 17 and cap 82, is fixed at one end to the upper part of the pipe member 87 and is exposed out at the other end. The exposed observing direction indicating member 106 is bent at the end in the outside diameter direction to form an observing direction indicating needle 107.

In the case of inserting the tip body 17 into the fixing tool body 86, the observing direction of the objective lens system 18 and the observing direction indicating needle 107 coincide with each other. As the pipe member 87 is rotated integrally with the tip body 17 by the spring member 89 and the tip body 17 rotates, the indicating needle 107 will rotate with the tip body and will therefore indicate the observing direction within the engine.

Figure 26:
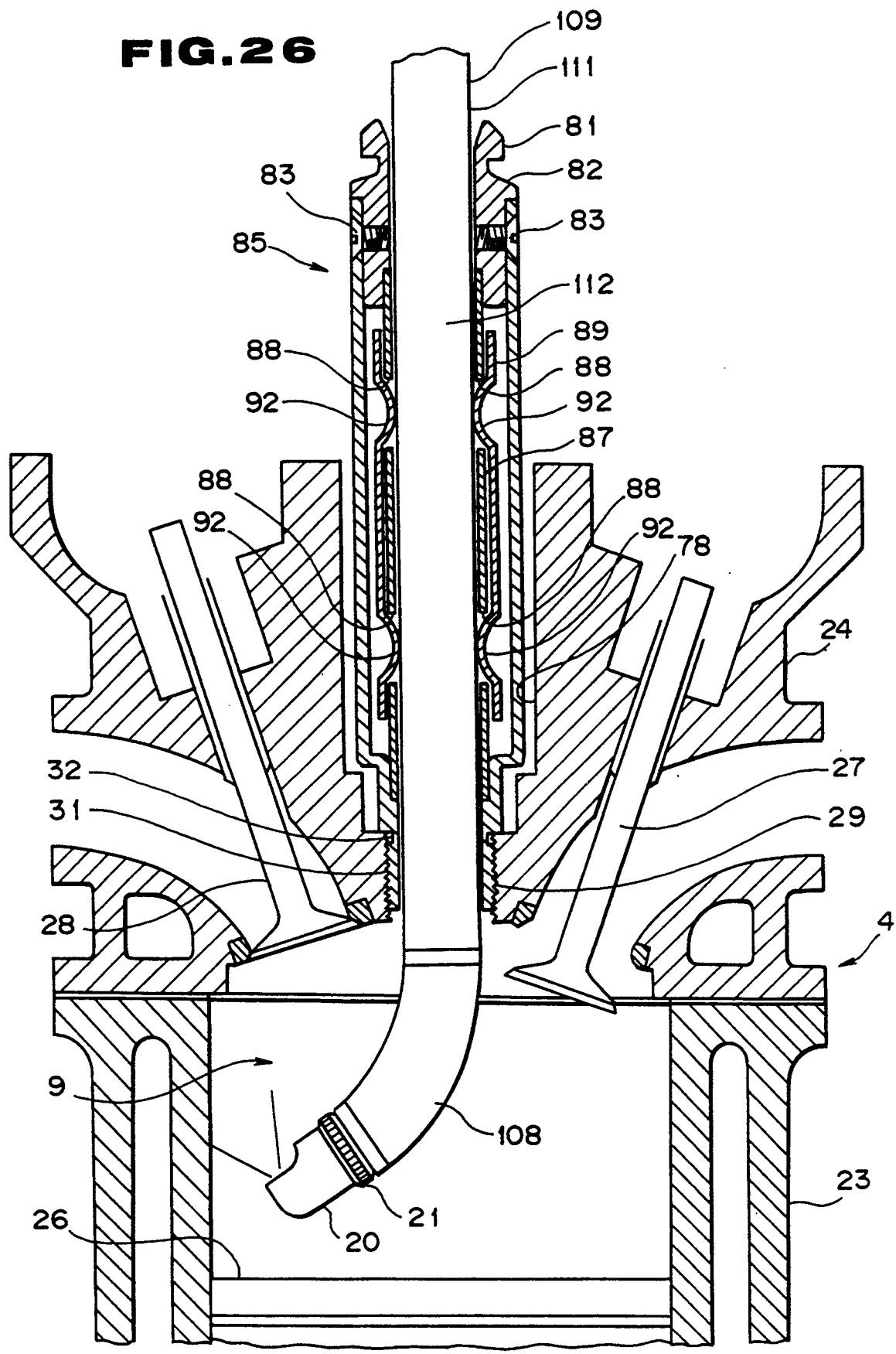
FIG. 26 is a view of the embodiment of FIG. 11 and having a curvable part adjacent the lead end together with a holding apparatus.

In FIG. 26, a flexible endoscope 109, having a curvable part 108, and with holding apparatus 85 are used in this embodiment.

The insertable part 111 of endoscope 109 is removably fitted in the tip part with a side viewing type tip attachment 20 and is connected with the curvable part 108 in the rear of the tip part. Further, a flexible part 112 held by the fixing tool body 86 is connected at one of its ends to the curvable part 108.

The above mentioned curvable part 108 can be curved by a curving operation knob provided in an operating part not illustrated. When the curvable part 108 is curved, the observing direction within the engine will be able to be changed. Therefore, in order to change the observing direction, the insertable part 111 need not be pulled out of the engine 4.

Figure 27:
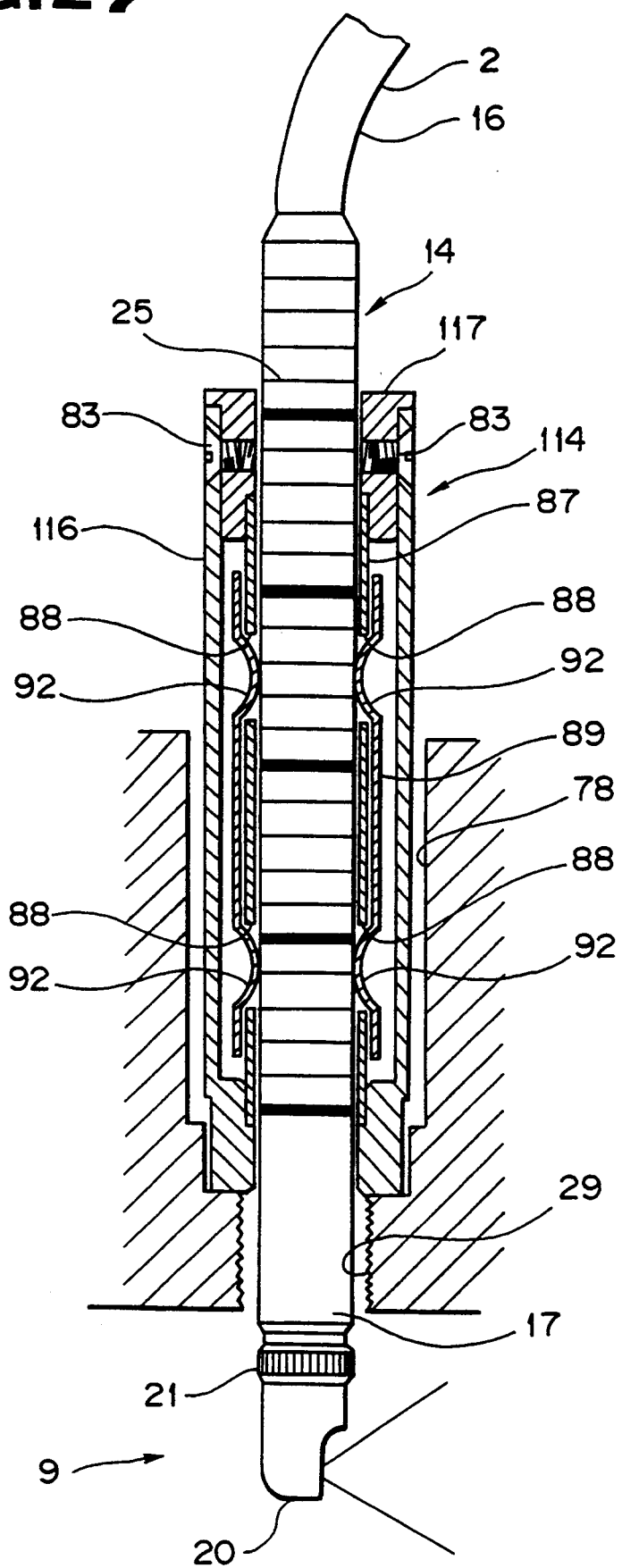
FIG. 27 is a sectional view of the seventh embodiment of the present invention and a holding apparatus for use therewith.

FIG. 27 shows the seventh embodiment of the present invention.

The holding apparatus 114 of this embodiment is the same as the holding apparatus 85 of the sixth embodiment but from which the fixing means 29 with the engine 4 is removed.

The fixing tool body 116 as a holding means of this embodiment is the same as the fixing tool body 86 of the sixth embodiment with the male screw part 31 removed and with the holding apparatus 114 inserted into the plug inserting hole 78. Therefore, as the fixing tool body 116 is not required to be screwed into the spark plug fixing female screw part 29, the cap 117 fitted to the upper part of the fixing tool body 116 is the cap 82 described in the sixth embodiment with the nut part 81 removed.

In the case of leading the above mentioned holding apparatus 114 into the engine, the tip body 17, as fitted with the holding apparatus 114, is inserted into the spark plug inserting hole 78 and the tip attachment 20 is positioned within the combustion chamber 9.

The other formations and operations are the same as the sixth embodiment.

In this seventh embodiment, because it is not necessary to screw the holding apparatus 114 into the spark plug fixing female screw part 29, the holding apparatus 114 can be simply fitted to and removed from the engine 4.

The other effects are the same as in the first embodiment.

Figure 28:
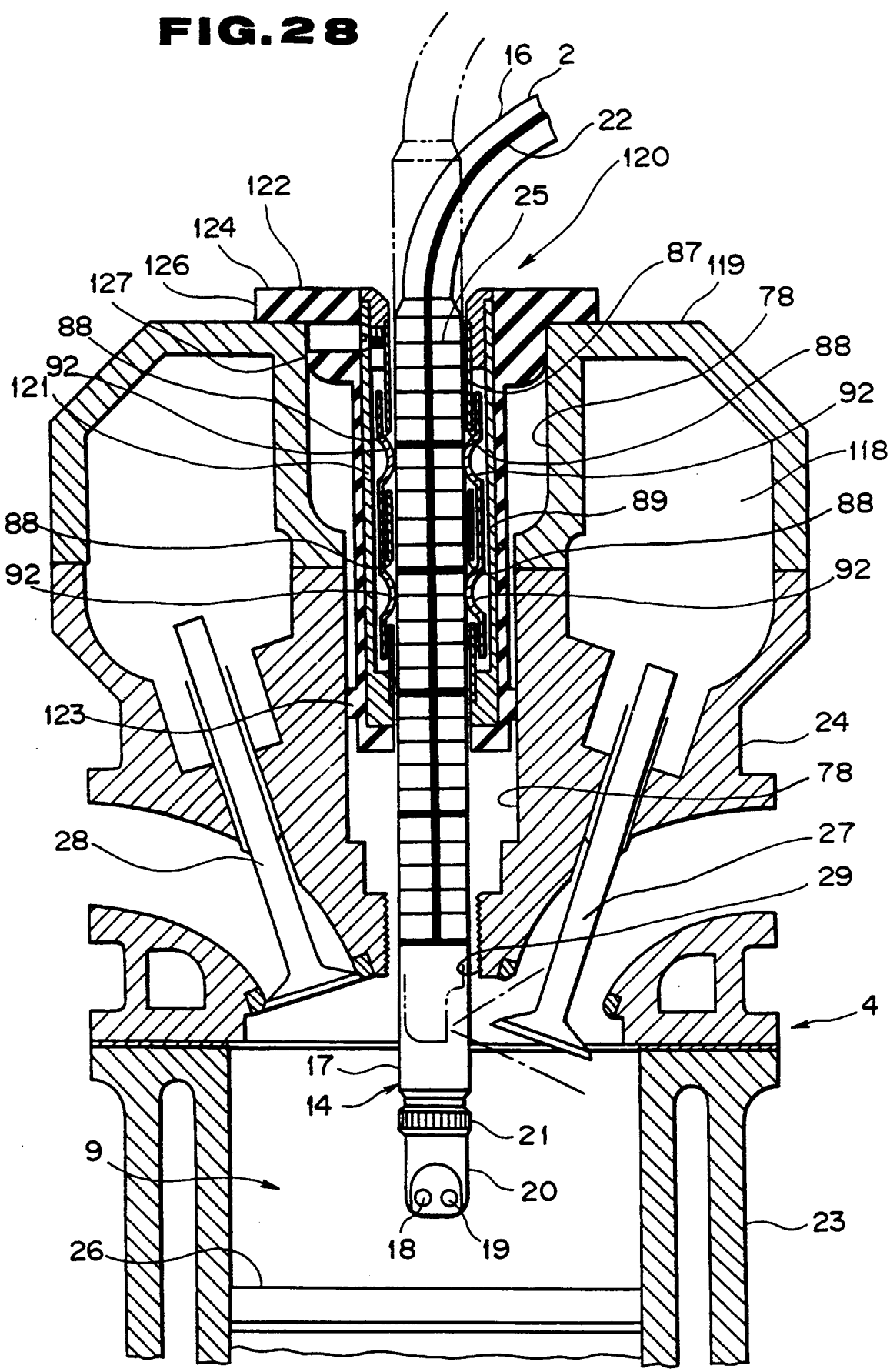
FIG. 28 is a sectional view of the eighth embodiment of the present invention and a holding apparatus for use therewith.

FIG. 28 shows the eighth embodiment of the present invention.

The engine 4 in this embodiment is the overhead cam shaft type engine having the cam shaft in the upper part of the cylinder head and described in the fifth embodiment.

The intake valve 27 and exhaust valve 28 of the above mentioned engine are opened and closed by the above mentioned cam shaft, not illustrated. This cam shaft is housed within a rocker chamber 118 which is covered with a cam cover 119 provided with the spark plug inserting hole 78 communicating with the spark plug fixing female screw part 29 provided in the upper central part of the combustion chamber 9.

The spark plug inserting hole 78 forms a spark plug hole together with the spark plug fixing female threaded part 29.

The holding apparatus 120 of this embodiment is not threaded into the spark plug fixing female screw part 29 but is fixed to the spark plug inserting hole 78.

The fixing tool body 121, as the holding means of this embodiment, has the fixing member 122 as a second fixing means formed to be substantially cylindrical, of such elastic material, as rubber, externally fitted and fixed to the same fixing tool body 116 as of the seventh embodiment.

A first flange 123, having an outside diameter somewhat larger than the inside diameter of the spark plug inserting hole 78, is peripherally provided on the lower outer peripheral wall of the above mentioned fixing member 122 and a second flange 124 is peripherally provided on the upper peripheral wall.

The above mentioned second flange 124 has a large diameter part 126 and a small diameter part 127 formed to be of an outside diameter smaller than the diameter of the large diameter part 126 and more, or less, larger than the inside diameter of the spark plug inserting hole 78. The large diameter part 126 contacts the cam cover 119 so as to cover the inserting hole 78 from the upper surface of the cam cover 119. The small diameter part 127 presses in the outside diameter direction the spark plug inserting hole 78 together with the first flange 123 so as to fix the holding apparatus 120 in the spark plug inserting hole 78.

In the case of fitting the above mentioned holding apparatus 120 to the engine 4, the fixing tool body 121, externally fitted with the fixing member 122, is pushed into the spark plug inserting hole 78. Then, the first flange 123 and small diameter part 127 will be pressed by the inner peripheral wall surface of the inserting hole 78 and the reaction of this pressing force will become a holding force holding the holding apparatus 120.

The other formations and operations are the same as in the seventh embodiment.

In this eighth embodiment, as the fixing member 122 is formed of an elastic material and is elastically deformed so that the holding apparatus 120 may be held in the inserting hole 78, in the case of fitting the holding apparatus 120 to the engine 4, the fitting and removing works can be made without requiring any special tool.

The other effects are the same as in the first embodiment.

Figure 29:
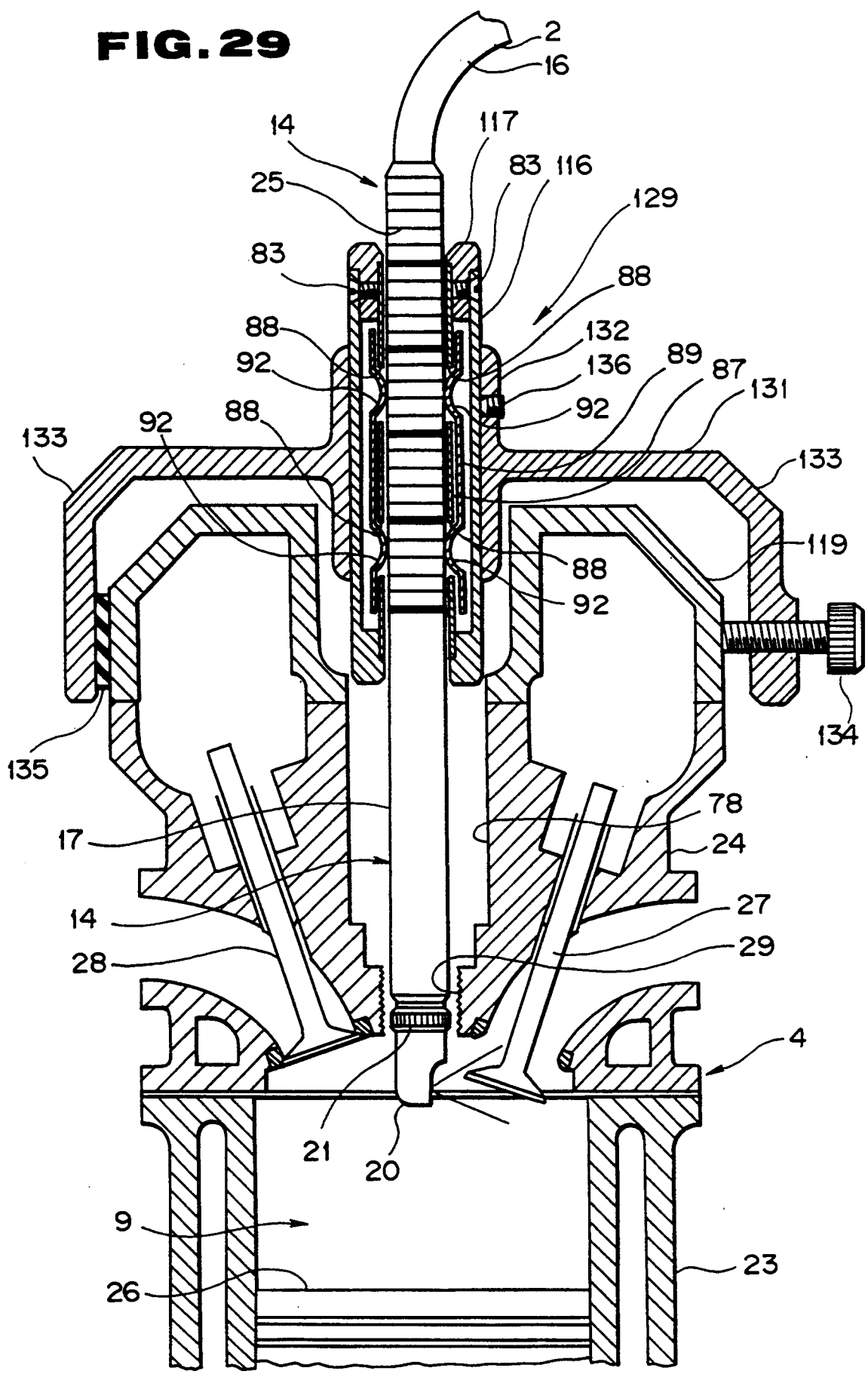
FIG. 29 is a sectional view of the ninth embodiment of the present invention and a holding apparatus for use therewith.

FIG. 29 shows the ninth embodiment of the present invention.

The holding apparatus 129, in this embodiment, is provided with a holding jig 131 as a second fixing means in the fixing tool body 116 described in the seventh embodiment and is to be used for an overhead cam shaft type engine.

The above mentioned holding jig 131 is provided in the central part with a pipe part 132 in which the holding tool body 116 is inserted and from the central part of the outer peripheral wall of the pipe part 132 with L-like arms 133 so as to lead to the side from the upper surface of the cam cover 119.

A plate-like rubber member 135 is fitted to the part facing the side of the cam cover 119 of the above mentioned one arm 133 so as to contact the side of the cam cover 119.

A screw 134 is screwed into the other arm 133 so as to contact at the tip with the side of the cam cover 119.

On the other hand, a fixing screw 136 is screwed in the diametral direction into the pipe part 132 so as to press the outer peripheral wall surface of the fixing tool body 116 to fix the fixing tool body 116 and holding jig 131.

In the case of fitting the above mentioned holding apparatus 129 to the engine 4, the fixing tool body 116 is fixed to the holding jig 131, with the fixing screw 136, and is fixed to the engine 4 by tightening the screw 134. When the screw 134 is tightened, it will press, at its tip, the cam cover 119 on the side, the cam cover 119 will be held, from the right and left, by the screw 134 and rubber member 135 and holding jig 131 is fixed to the engine 4.

Then, the tip body 17 is inserted and the tip attachment 20 is positioned within the combustion chamber 9.

The other formations and operations are the same as the seventh embodiment.

Also, though not illustrated, the fixing screws 134 may be provided in both arm parts 133. In such case, the holding jig 131 will be adjustable with respect to the plug inserting hole 78 and the endoscope will be able to be positioned in the center of the plug inserting hole 78.

In this embodiment, the spark plug inserting hole 78 is provided in the center part of the engine 4. However, even in case the spark plug inserting hole 78 is not in the central part of the engine 4, by replacing the holding jig 131, the interior of the combustion chamber 9 will be able to be inspected.

The other effects are the same as in the first embodiment.

Figure 30:
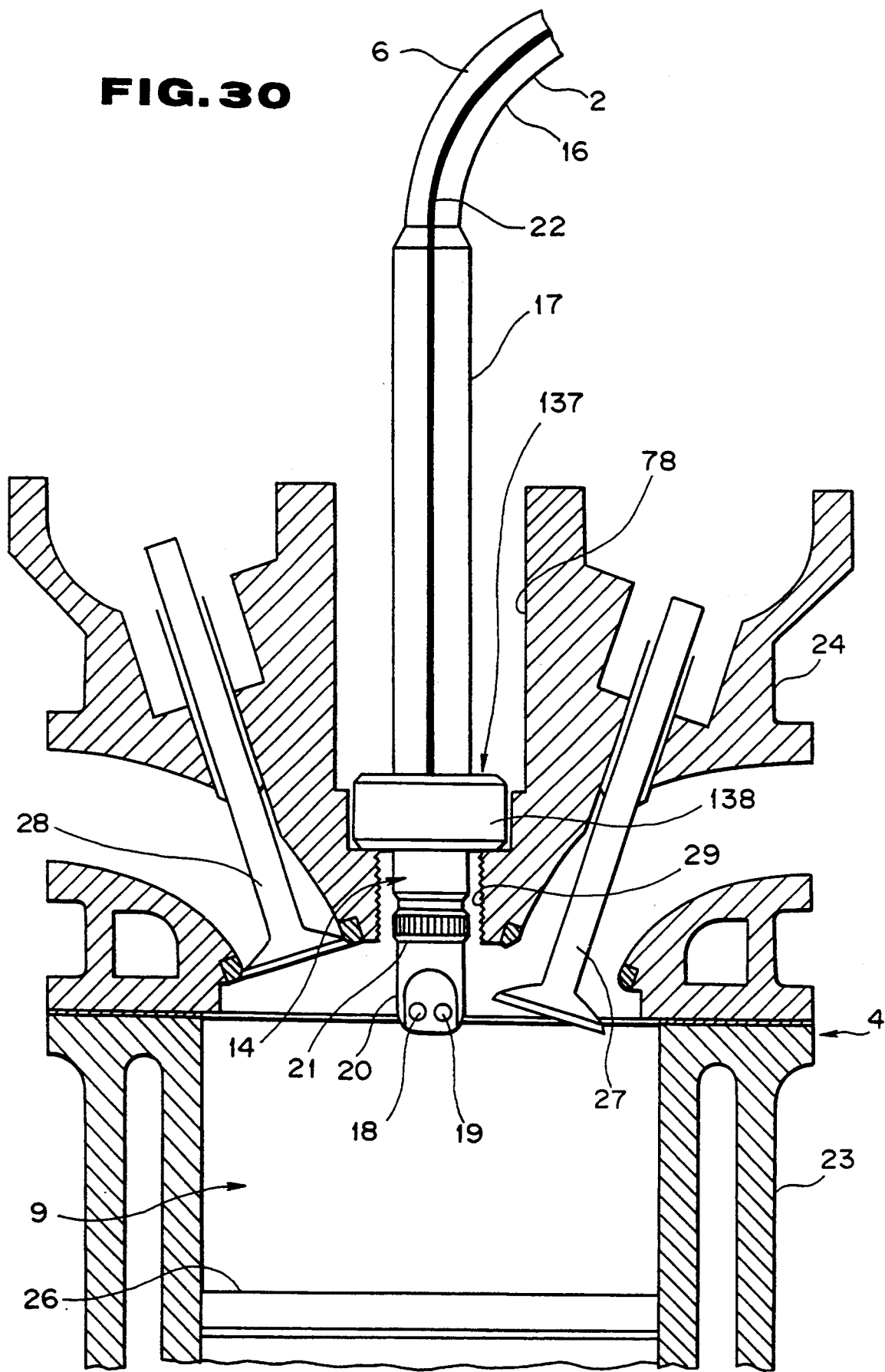
FIG. 30 is a sectional view of the tenth embodiment of the present invention and a holding apparatus for use therewith.

FIG. 30 shows the tenth embodiment of the present invention.

The holding apparatus 137 in this embodiment is integral with the tip body 17.

The holding apparatus 137 is provided on the tip body 17 provided in the insertable part 6 of the endoscope 2 and forms a flange 138 as a holding means. The outside diameter of this flange 138 is somewhat smaller than the inside diameter of the spark plug inserting hole 78 but is larger than the spark plug fixing female threaded part 29.

Also, the dimension of the flange 138 from the objective lens system 18 of the tip attachment 20 is determined so that, in case the flange 138 is inserted into the combustion chamber, the part than can be observed through lens system 18 may be known in advance. Therefore, such inserted depth scale 25 as is described in the first embodiment is not provided but only the observing direction indicating line 22, aligned with lens system 18, is provided on the tip body 17.

The other formations are the same as in the first embodiment.

In this embodiment, as the flange 138 i fixed, it is not necessary to adjust the position in fitting the holding apparatus and tip body and inserting the tip part into the combustion chamber 9.

Also, as no fixing means with the engine 4 is provided, the fitting and removing works can be simply made.

The other effects are the same as in the first embodiment.

Figure 31:
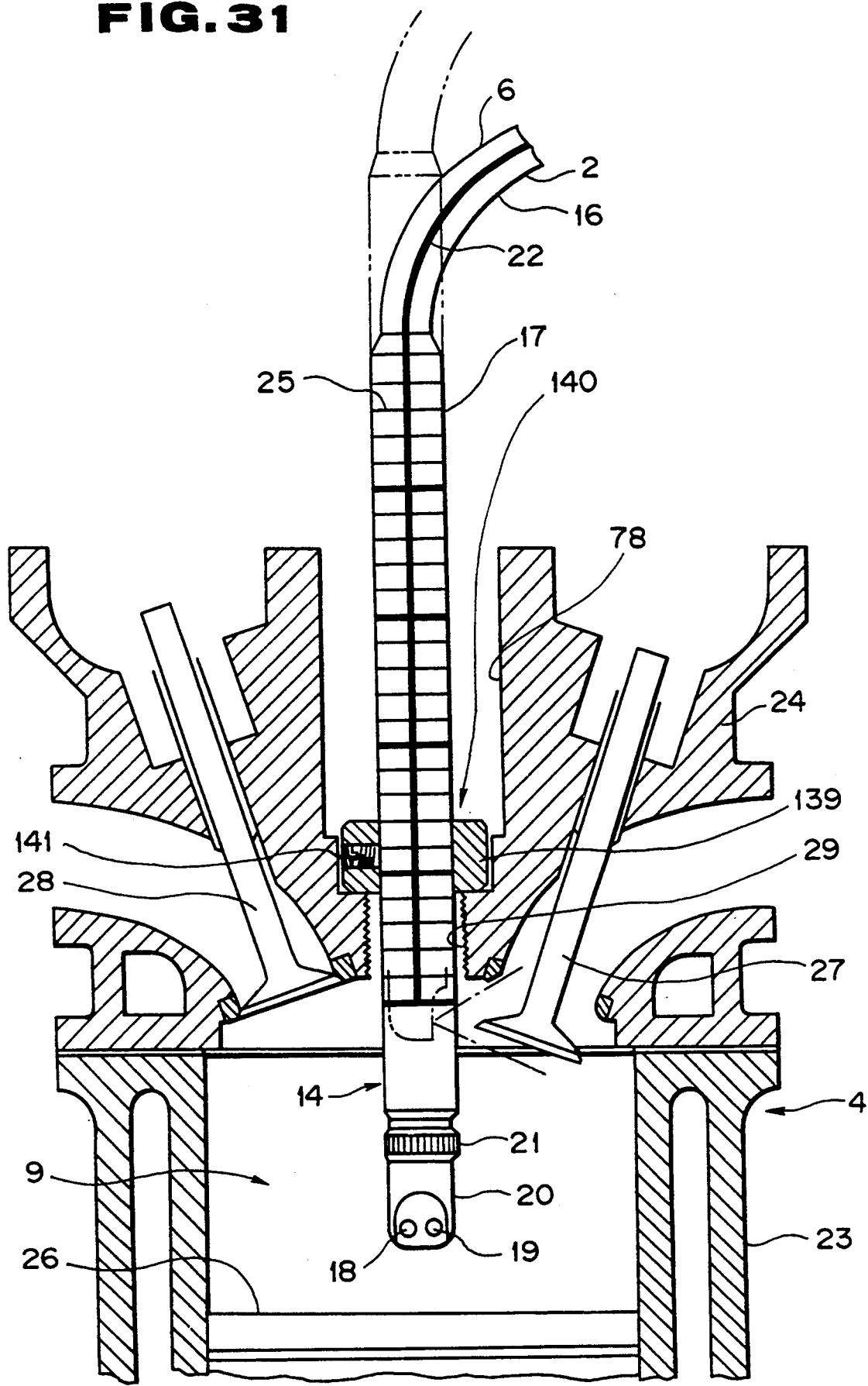
FIG. 31 is a view, partly in section, of the 11th embodiment of the present invention and a holding apparatus for use therewith.

FIG. 31 shows the 11th embodiment of the present invention.

In a holding apparatus 140 in the eleventh embodiment, the flange 138 described in the tenth embodiment is removably fitted.

In this embodiment, the holding apparatus 140 is removably externally fitted to the tip body 17, is a ring member 139 as a holding means formed to be ring-like and is of an outside diameter somewhat smaller than the spark plug inserting hole 78 but larger than the spark plug fixing female screw part 29.

A fixing screw 141 as a first fixing means is threaded in the diametral direction into the ring member 139 and presses the outer peripheral wall surface of the tip body 17 so that the ring member 139 may be fixed to the tip body 17.

In the case of inserting the above mentioned tip body 17 into the combustion chamber 9, the position of the ring member 139 is adjusted so as to be of the inserted depth corresponding to the part to be observed within the combustion chamber and the ring member 139 is fixed with the fixing screw 141. In the case of changing the part to be observed, the tip body 17 is pulled out, has the ring member 139 moved and is again inserted into the combustion chamber 9.

The other formations and operations are the same as in the first embodiment.

In this eleventh embodiment, as compared with the tenth embodiment, as the inserted depth into the combustion chamber 9 can be varied, any part within the combustion chamber 9 can be observed.

The other effects are the same as the first embodiment.

Figure 32:
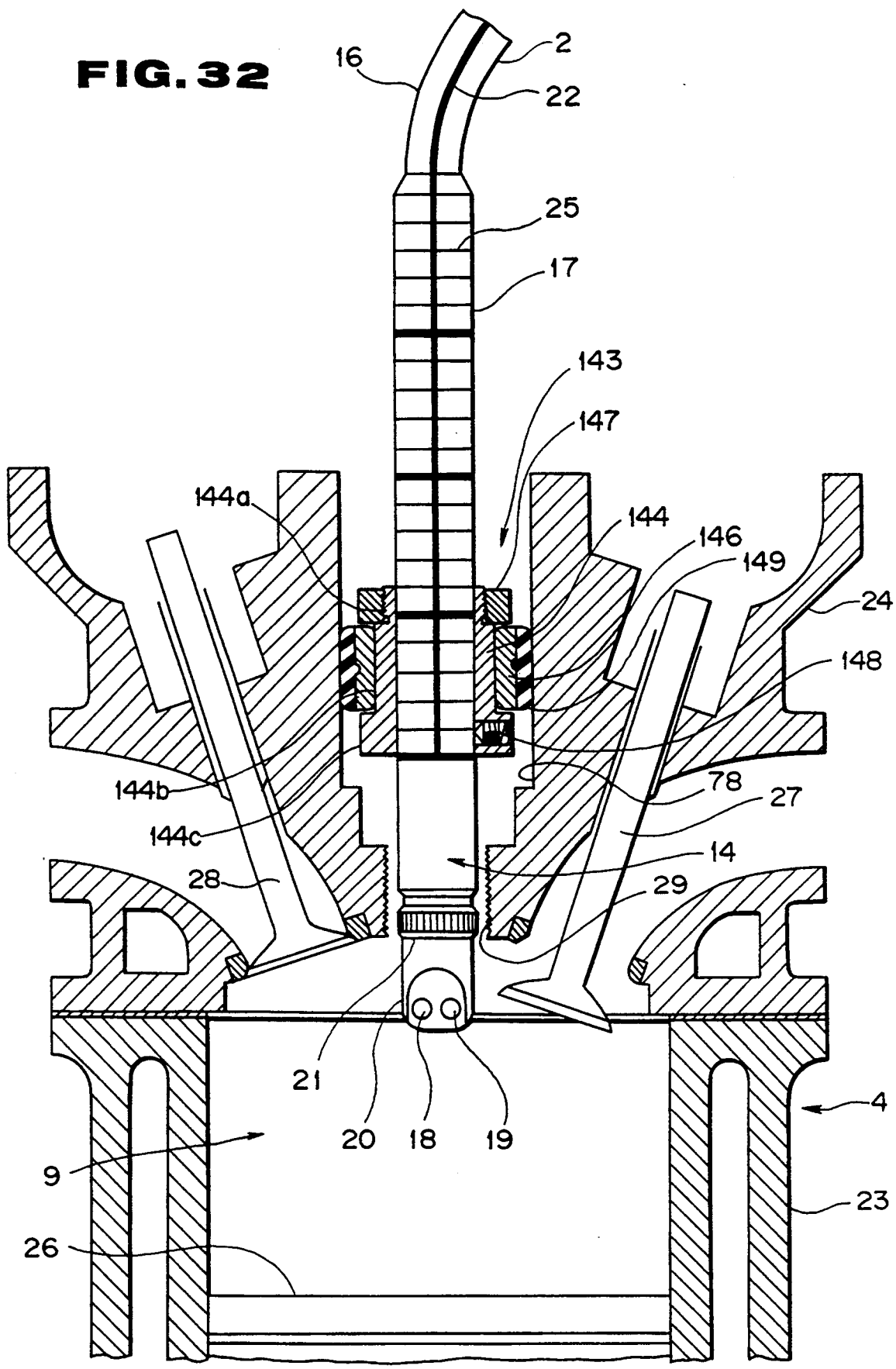
FIG. 32 is a view, partly in section, of the 12th embodiment of the present invention and a holding apparatus for use therewith.

FIG. 32 shows the 12th embodiment of the present invention.

In the holding apparatus 143 in this invention, a holding means for holding the holding apparatus 143 in the spark plug inserting hole 78 is provided for the ring member 139 described in the 11th embodiment.

The holding apparatus 143 is externally fitted and fixed to the tip body 17 in this embodiment and is formed of a substantially cylindrical body member as a holding means, a holding member 146 and a ring nut 147.

The above mentioned body member 144 has a small diameter part 144a, intermediate diameter part 144b and large diameter part 144c formed so that the outside diameter may become larger in three steps from the upper part toward the lower part. A fixing screw 148 as a first fixing means is screwed in the diametral direction into the large diameter part 144c so as to fix the holding apparatus 143 to the tip body 17.

Also, the above mentioned holding member 146 is rotatably externally fitted to the intermediate diameter part 144b by making its outer peripheral surface a sliding surface and is formed like a ring on the outer periphery of which a rubber ring-like member 149, as a second fixing means, is fixed. The outside diameter of the rubber member 149 is somewhat larger than the insert diameter of the spark plug inserting hole 78 so that, in case the rubber member 149 is inserted into the inserting hole 78, it may press the inserting hole 78 on the inner peripheral surface and the holding apparatus 143 may be held within the inserting hole 78 by this pressing force.

Further, the ring nut 147 is threaded onto the small diameter part 144a so that the holding member 146 may not drop.

In the case of fitting the above mentioned holding apparatus 143 to the engine 4, the position is adjusted so as to be of a predetermined inserted depth, then the fixing screw 148 is screwed in to fix the holding apparatus 143 to the tip body 17 and thereafter the holding apparatus 143 is inserted into the spark plug inserting hole 78.

The rubber member 149 will press the inserting hole 78 on the inner peripheral surface and this pressing force will become a holding force for the holding apparatus 143.

In the case of changing the observing direction, when the tip body 17 is rotated, the outer peripheral wall surface of the intermediate diameter part 144b of the body member 144 will become a sliding surface and the body member 144 side will rotate with respect to the holding member 46.

The other formations and operations are the same as in the first embodiment.

In this embodiment, as compared with the first embodiment, as the holding apparatus can be fixed without being threaded into the engine 4, the fitting and removing works can be easily made.

The other effects are the same as in the first embodiment.

Figure 33:
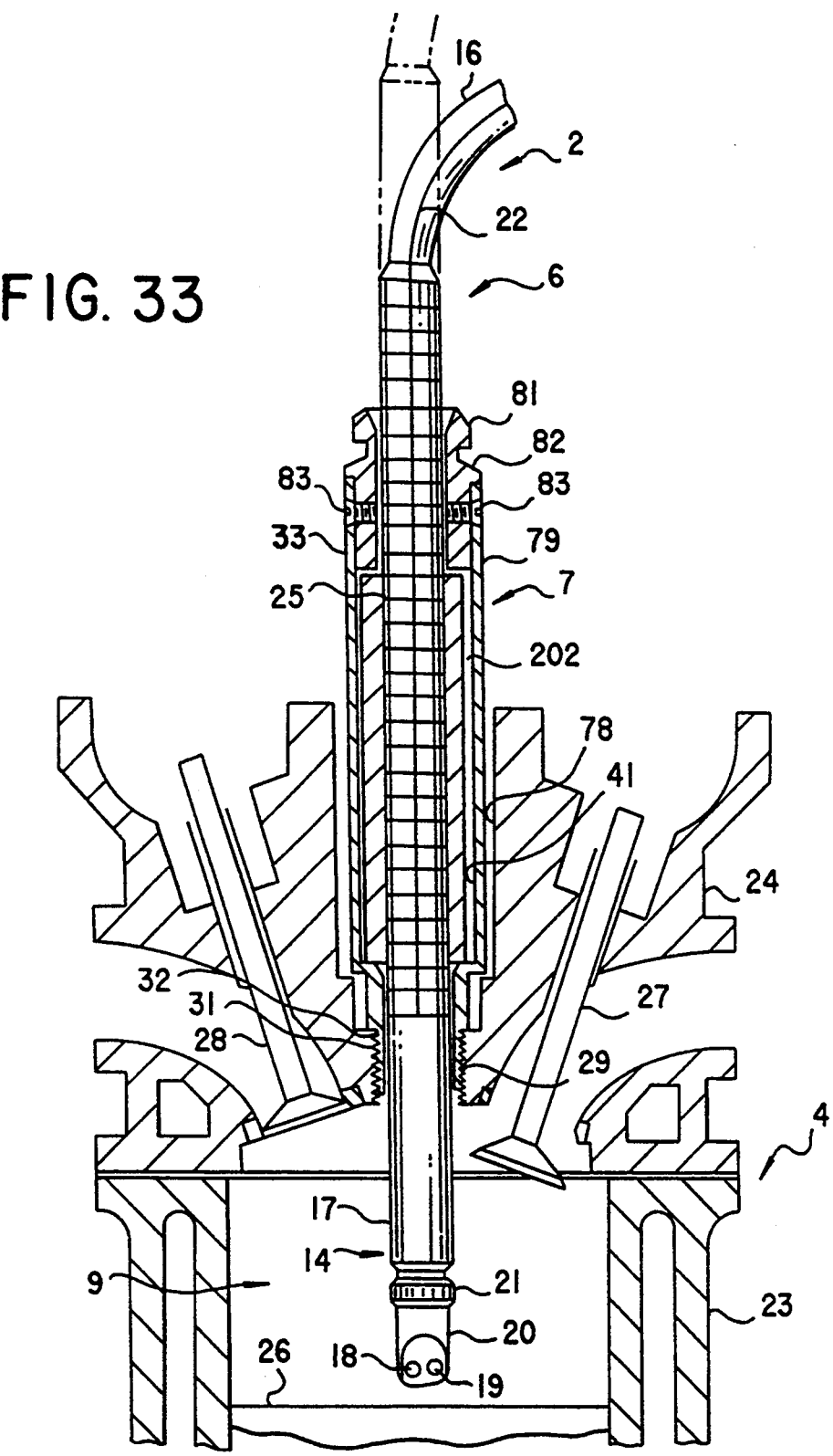
FIG. 33 is a view, partly in section, of the 13th embodiment of the present invention and a holding apparatus for use therewith.
Figure 34:
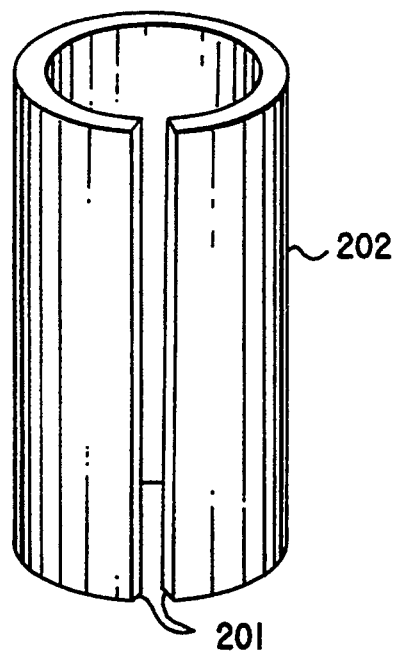
FIG. 34 is a perspective view of a combined pipe and spring member of the embodiment of FIG. 33.

As shown in FIGS. 33 and 34, embodiment 13 uses a tubular spring member 202, provided with a slit 201 in the lengthwise direction, with spring power of spring member 202 in the inner diameter of spring member 202. Thus, the inner diameter of spring member 202, in its relaxed position, as shown in FIG. 34 and before insertion of insertable part 6 of endoscope 2, is smaller than the outer diameter of the tip body 17 of endoscope 2.

In this embodiment, the insertable end of the endoscope 2, inserted into spring member 202 and held, is adjustable in the axial direction and held, in axial direction after adjustment, by spring friction of member 202. Friction is not applied in the circumferential direction so that the insertable end, with spring member 202, in axial friction contact therewith, is rotatable in larger diameter part 33.

In the above mentioned respective embodiments, the light source apparatus 3 is provided so that the interior of the combustion chamber may be observed with the illuminating light from this light source apparatus but a tip lamp may be provided in the endoscope inserting part so that the interior may be observed with the illuminating light emitted from this tip lamp.

As explained above, according to the present invention, an endoscope tip can be stably and stationarily held in any desired position within an engine combustion chamber.

What is claimed is:

1. An endoscope holding apparatus for holding an insertable part of an endoscope in a combustion chamber of an internal combustion engine having ignition plug holes and inserted through said plug holes for viewing the interior of said combustion chamber through insertable end comprising:
   a fixing means for fixing said insertable end of said endoscope in a stationary position in a selected hole of said ignition plug holes, said fixing means extending from said ignition plug hole to the outside of said combustion chamber without extending into said combustion chamber; and
   a supporting means for supporting said fixing means in the internal combustion engine.

2. An endoscope apparatus for observing the interior of a combustion chamber of an internal combustion engine having ignition plug holes comprising:
   an endoscope having an insertable part having in the tip part an observing window for observing said interior of the combustion chamber and an illuminating window for illuminating said interior of said combustion chamber, said insertable part being at one end of said endoscope and being insertable into said combustion chamber, said endoscope having an operating part connected to the opposite end of said endoscope;
   a fixing means for fixing said insertable part in a stationary position in said combustion chamber through the interior of a spark plug hole provided in said engine for insertion of a spark plug for a spark ignition in said combustion chamber, said fixing means extending from said ignition plug hole to the outside of said combustion chamber without extending into said combustion chamber;
   a supporting means for supporting said fixing means in the internal combustion engine; and
   a light source apparatus connected to said endoscope and feeding said tip part of said endoscope with an illuminating light for emission through said illuminating window.

3. An apparatus according to claim 2 wherein said operating part further has an eyepiece part by which an object image taken in from said observing window can be observed.

4. An apparatus according to claim 3 wherein said endoscope is a flexible endoscope in which a part of said insertable part is flexible.

5. An apparatus according to claim 3 wherein said endoscope is a rigid endoscope in which the whole of said insertable part is rigid.

6. An apparatus according to claim 2 wherein said endoscope is an electronic endoscope.

7. An apparatus according to claim 2 wherein said endoscope is provided in the tip part of said insertable part removably with a visual field changing attachment for changing the visual field direction of said endoscope.

8. An apparatus according to claim 2 wherein said insertable part inserted into said combustion chamber of said endoscope is provided with a curvable part for changing the observing direction of said endoscope.

9. An apparatus according to claim 1 or claim 2 further comprising an observing position setting means for setting an observing position within said combustion chamber of said endoscope.

10. An apparatus according to claim 9 wherein said observing position setting means comprises an inserted depth scale provided on said insertable part and capable of measuring the amount by which said insertable part is inserted into said combustion chamber and an observing direction indicating line provided in the direction coinciding with the observing direction of said endoscope in the lengthwise direction of said insertable part.

11. An apparatus according to claim 1 or claim 2, wherein said fixing means is a spring member pressing said insertable part on the periphery to hold said insertable part.

12. An apparatus according to claim 11, wherein said spring member is provided with an observing position setting means for setting the observing position of said endoscope.

13. An apparatus according to claim 1 or claim 2, wherein said fixing means is a spring member pressing said insertable part on the periphery of said insertable part to hold said insertable part and said supporting means is a screw part threaded into said spark plug hole for fixing said holding means to said engine.

14. An apparatus according to claim 1 or claim 2, wherein said fixing means is a spring member pressing said insertable part on the periphery for holding said insertable part and said supporting means is an elastic member inserted in said spark plug hole for fixing said holding means to said engine.

15. An apparatus according to claim 14 wherein said elastic member is inserted between spark plug screw part forming said spark plug hole and said holding means.

16. An apparatus according to claim 15 wherein said elastic member is of cylindrically formed rubber.

17. An apparatus according to claim 14 wherein said elastic member is inserted between a spark plug inserting hole forming said spark plug hole and said holding means.

18. An apparatus according to claim 1 or claim 2, wherein said fixing means is an elastic member pressing said insertable part on the periphery of said insertable part for holding said insertable part and said supporting means is a screw part screwed into said spark plug hole for fixing said holding means to said engine.

19. An apparatus according to claim 18 wherein said elastic member is of cylindrically formed rubber.

20. An apparatus according to claim 18 wherein said elastic member is an O-ring.

21. An apparatus according to claim 1 or claim 2, wherein said fixing means is a spring member pressing said insertable part on the periphery of said insertable part for holding said insertable part and said supporting means is a holding jug holding a cam cover of said engine.

22. An apparatus according to claim 1 or claim 2, wherein said supporting means is a ring-like elastic member elastically deformed when inserted into said spark plug hole.

23. An apparatus according to either of claim 1 or 2 wherein said holding means is further provided with an impurity drop preventing means in an inserting port for inserting said insertable part.

24. An apparatus according to claim 23 wherein said impurity drop preventing means is formed of an elastic material to be substantially disc-like and has slits through which said insertable part can be inserted formed in the middle of said disc.

25. An apparatus according to claim 23 wherein said impurity drop preventing means is a lid closing said inserting port with a spring force when said insertable part is removed from said holding means.

26. An endoscope holding apparatus rotatably secured in an ignition spark plug hole of an internal combustion engine for holding an insertable end of an endoscope, comprising:
a fixing means for rotatably fixing a circumferential portion of said insertable part of said endoscope in a circumferential direction positioned in a combustion chamber through the interior of said ignition spark plug hole, said fixing means slidably fixing said insertable part with sufficient friction for supporting the weight of said endoscope in an axial direction; and
a supporting means for supporting said fixing means in the internal combustion engine.

27. An endoscope apparatus for observing a combustion chamber of an internal combustion engine, comprising:
an endoscope having an insertable part having in the tip part an observing window and an illuminating window, and said endoscope having an operating part;
an endoscope holding apparatus rotatably secured in an ignition spark plug hole in said combustion chamber for rotatably fixing a circumferential portion of said insertable part of said endoscope in a circumferential direction and for slidably fixing said insertable part with sufficient friction for supporting the weight of said endoscope in an axial direction; and
a light source.

28. An endoscope apparatus for observing a combustion chamber in an internal combustion engine, comprising:
an endoscope having an insertable part containing an observing window and an illuminating window in a tip part, said endoscope also having an operating part;
an endoscope holding apparatus rotatably secured in a spark plug hole in said combustion chamber for rotatably fixing a circumferential portion of said insertable part of said endoscope in a circumferential direction and for slidably fixing said insertable part with sufficient friction for supporting the weight of said endoscope in an axial direction; and
a light source.

* * * * *